US012700339B2

(12) United States Patent
Kim et al.

(10) Patent No.: US 12,700,339 B2
(45) Date of Patent: Aug. 4, 2026

(54) DISPLAY APPARATUS, AND ELECTRONIC APPARATUS INCLUDING THE SAME

(71) Applicant: SAMSUNG DISPLAY CO., LTD., Yongin-si (KR)

(72) Inventors: Jiyoun Kim, Yongin-si (KR); Sangan Kwon, Yongin-si (KR); Namjeong Kim, Yongin-si (KR); Jihye Kim, Yongin-si (KR); Haneul Kim, Yongin-si (KR); Hongsoo Kim, Yongin-si (KR); Changnoh Yoon, Yongin-si (KR); Sukhun Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/079,983

(22) Filed: Mar. 14, 2025

(65) Prior Publication Data

US 2026/0011280 A1 Jan. 8, 2026

(30) Foreign Application Priority Data

Jul. 3, 2024 (KR) ........................ 10-2024-0087283

(51) Int. Cl.
*G09G 3/20* (2006.01)

(52) U.S. Cl.
CPC ....... *G09G 3/2074* (2013.01); *G09G 2320/02* (2013.01); *G09G 2320/068* (2013.01); *G09G 2354/00* (2013.01); *G09G 2358/00* (2013.01)

(58) Field of Classification Search
CPC ............. G09G 3/2074; G09G 2320/02; G09G 2320/068; G09G 2354/00; G09G 2358/00
See application file for complete search history.

(56) References Cited

U.S. PATENT DOCUMENTS

| | | | | |
|---|---|---|---|---|
| 2022/0358875 A1* | 11/2022 | Won | G09G 3/32 | |
| 2023/0217690 A1* | 7/2023 | Hong | H10K 59/353 | 345/173 |
| 2024/0023419 A1 | 1/2024 | Kim et al. | | |
| 2024/0212576 A1* | 6/2024 | Lee | G09G 3/2007 | |

FOREIGN PATENT DOCUMENTS

| | | | |
|---|---|---|---|
| CN | 117393686 | A | 1/2024 |
| CN | 117456917 | A | 1/2024 |
| EP | 4307865 | A1 | 1/2024 |
| KR | 10-2023-0102365 | A | 7/2023 |
| KR | 10-2611958 | B1 | 12/2023 |
| KR | 10-2024-0009015 | A | 1/2024 |

* cited by examiner

*Primary Examiner* — Jonathan A Boyd
(74) *Attorney, Agent, or Firm* — F. CHAU & ASSOCIATES, LLC

(57) ABSTRACT

A display apparatus includes a display panel and a display panel driver. The display panel includes a first display area and a second display area disposed adjacent to the first display area. The display panel driver is configured to output a first data voltage to the first display area and a second data voltage to the second display area. When the first display area operates in a public mode and the second display area operates in a private mode, the first data voltage is different from the second data voltage for a same grayscale value. A viewing angle of a display image displayed in the private mode is narrower than a viewing angle of a display image displayed in the public mode.

20 Claims, 20 Drawing Sheets

DISPLAY APPARATUS, AND ELECTRONIC APPARATUS INCLUDING THE SAME

CROSS-REFERENCE TO RELATED APPLICATIONS

This application claims priority under 35 U.S.C. § 119 to Korean Patent Application No. 10-2024-0087283, filed on Jul. 3, 2024, the disclosure of which is incorporated by reference herein in its entirety.

TECHNICAL FIELD

Embodiments of the present inventive concept relate to a display apparatus, a method of driving the display apparatus, and an electronic apparatus including the display apparatus.

More particularly, embodiments of the present inventive concept relate to a display apparatus that outputs a data voltage of a first display area and a data voltage of a second display area, which are different from each other for the same grayscale value, which may prevent a boundary between the first display area and the second display area from being visible when the first display area operates in a public mode and the second display area operates in a private mode, a method of driving the display apparatus, and an electronic apparatus including the display apparatus.

DISCUSSION OF RELATED ART

Generally, a display apparatus includes a display panel and a display panel driver. The display panel displays an image based on input image data. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls an operation of the gate driver and an operation of the data driver.

A display panel used inside an automotive vehicle may include a display area visible for a driver and a display area visible for a passenger. The display area for the driver may be driven in a public mode having a wide viewing angle and the display area for the passenger may be driven in a private mode having a narrow viewing angle.

SUMMARY

Embodiments of the present inventive concept provide a display apparatus that outputs a first data voltage to a first display area and a second data voltage to a second display area, which are different from each other for the same grayscale value. As a result, a boundary between the first display area and the second display area may be prevented from being visible when the first display area operates in a public mode and the second display area operates in a private mode.

Embodiments of the present inventive concept also provide a method of driving the display apparatus.

Embodiments of the present inventive concept also provide an electronic apparatus including the display apparatus.

According to an embodiment of the present inventive concept, a display apparatus includes a display panel and a display panel driver. The display panel includes a first display area and a second display area disposed adjacent to the first display area. The display panel driver is configured to output a first data voltage to the first display area and a second data voltage to the second display area. When the first display area operates in a public mode and the second display area operates in a private mode, the first data voltage is different from the second data voltage for a same grayscale value. A viewing angle of a display image displayed in the private mode is narrower than a viewing angle of a display image displayed in the public mode.

In an embodiment, when the first display area operates in the public mode and the second display area operates in the private mode, the first data voltage is generated based on a first gamma lookup table and the second data voltage is generated based on a second gamma lookup table different from the first gamma lookup table.

In an embodiment, a unit area luminance represented by a gamma reference voltage of the second gamma lookup table is higher than a unit area luminance represented by a gamma reference voltage of the first gamma lookup table.

In an embodiment, when both the first display area and the second display area operate in the public mode or both the first display area and the second display area operate in the private mode, the first data voltage output by the display panel driver to the first display area and the second data voltage output by the display panel driver to the second display area are equal to each other for the same grayscale value.

In an embodiment, when both the first display area and the second display area operate in the public mode, the first data voltage output by the display panel driver to the first display area and the second data voltage output by the display panel driver to the second display area are generated based on a first gamma lookup table. When both the first display area and the second display area operate in the private mode, the first data voltage output by the display panel driver to the first display area and the second data voltage output by the display panel driver to the second display area are generated based on a second gamma lookup table different from the first gamma lookup table.

In an embodiment, a unit area luminance represented by a gamma reference voltage of the second gamma lookup table is higher than a unit area luminance represented by a gamma reference voltage of the first gamma lookup table.

In an embodiment, when the first display area operates in the public mode and the second display area operates in the private mode, the display panel driver is configured to determine an update driving mode and an update boundary point.

In an embodiment, when a previous driving mode and the update driving mode are the same as each other and a previous boundary point and the update boundary point are the same as each other, the display panel driver is configured to maintain a previous gamma lookup table.

In an embodiment, when a previous driving mode and the update driving mode are different from each other or a previous boundary point and the update boundary point are different from each other and a scan direction of the display panel is perpendicular to a direction in which the first display area and the second display area are adjacent to each other, the display panel driver is configured to generate a data enable count signal by counting a data enable signal.

In an embodiment, when the previous driving mode and the update driving mode are different from each other or the previous boundary point and the update boundary point are different from each other, the scan direction of the display panel is perpendicular to the direction in which the first display area and the second display area are adjacent to each other, and the data enable count signal is less than the update boundary point, a data voltage of a present time point is generated using a first gamma lookup table. When the previous driving mode and the update driving mode are different from each other or the previous boundary point and the update boundary point are different from each other, the scan direction of the display panel is perpendicular to the direction in which the first display area and the second display area are adjacent to each other, and the data enable count signal is equal to or greater than the update boundary point, the data voltage of the present time point is generated using a second gamma lookup table different from the first gamma lookup table.

In an embodiment, when a previous driving mode and the update driving mode are different from each other or a previous boundary point and the update boundary point are different from each other and a scan direction of the display panel is parallel to a direction in which the first display area and the second display area are adjacent to each other, the display panel driver is configured to generate a gate line count signal.

In an embodiment, when the previous driving mode and the update driving mode are different from each other or the previous boundary point and the update boundary point are different from each other, the scan direction of the display panel is parallel to the direction in which the first display area and the second display area are adjacent to each other, and the gate line count signal is less than the update boundary point, a data voltage of a present time point is generated using a first gamma lookup table. When the previous driving mode and the update driving mode are different from each other or the previous boundary point and the update boundary point are different from each other, the scan direction of the display panel is parallel to the direction in which the first display area and the second display area are adjacent to each other, and the gate line count signal is equal to or greater than the update boundary point, the data voltage of the present time point is generated using a second gamma lookup table different from the first gamma lookup table.

In an embodiment, the display panel includes a normal pixel and a viewing angle control pixel. A viewing angle of the viewing angle control pixel is narrower than a viewing angle of the normal pixel.

In an embodiment, a size of a light-emitting area of a subpixel of the viewing angle control pixel is less than a size of a light-emitting area of a subpixel of the normal pixel.

In an embodiment, the normal pixel is turned on and the viewing angle control pixel is turned off in the public mode. The normal pixel is turned off and the viewing angle control pixel is turned on in the private mode.

In an embodiment, the normal pixel is turned on and the viewing angle control pixel is turned on in the public mode. The normal pixel is turned off and the viewing angle control pixel is turned on in the private mode.

In an embodiment, the display panel includes a first color first normal subpixel, a second color first normal subpixel and a third color first normal subpixel which are sequentially disposed in a first pixel row and a first color first viewing angle control subpixel, a second color first viewing angle control subpixel, a third color 1-1 viewing angle control subpixel and a third color 1-2 viewing angle control subpixel which are sequentially disposed in a second pixel row.

In an embodiment, a size of a light-emitting area of the first color first normal subpixel is larger than a size of a light-emitting area of the first color first viewing angle control subpixel. A size of a light-emitting area of the second color first normal subpixel is larger than a size of a light-emitting area of the second color first viewing angle control subpixel. A size of a light-emitting area of the third color first normal subpixel is larger than a sum of a size of a light-emitting area of the third color 1-1 viewing angle control subpixel and a size of a light-emitting area of the third color 1-2 viewing angle control subpixel.

In an embodiment, the display panel includes a first color first normal subpixel, a second color 1-1 normal subpixel, a second color 1-2 normal subpixel and a third color first normal subpixel disposed in a rhombic shape and a first color first viewing angle control subpixel, a second color 1-1 viewing angle control subpixel, a second color 1-2 viewing angle control subpixel and a third color first viewing angle control subpixel disposed in a rhombic shape.

In an embodiment, a size of a light-emitting area of the first color first normal subpixel is larger than a size of a light-emitting area of the first color first viewing angle control subpixel. A size of a light-emitting area of the second color 1-1 normal subpixel is larger than a size of a light-emitting area of the second color 1-1 viewing angle control subpixel. A size of a light-emitting area of the second color 1-2 normal subpixel is larger than a size of a light-emitting area of the second color 1-2 viewing angle control subpixel. A size of a light-emitting area of the third color first normal subpixel is larger than a size of a light-emitting area of the third color first viewing angle control subpixel.

According to an embodiment of the present inventive concept, an electronic device includes a processor, a memory having stored application programs for execution by the processor, a display apparatus, and a user interview. The display apparatus includes a display panel including a first display area and a second display area disposed adjacent to the first display area, and a display panel driver configured to output a first data voltage to the first display area and a second data voltage to the second display area. When the first display area operates in a public mode and the second display area operates in a private mode, the first data voltage is different from the second data voltage for a same grayscale value. A viewing angle of a display image displayed in the private mode is narrower than a viewing angle of a display image displayed in the public mode. The user interface is configured to sense user input via touch or cursor select of an icon presented on the display panel. The processor is caused to execute one or more of the stored application programs upon receipt of the user input.

According to an embodiment of the present inventive concept, a method of driving a display apparatus includes determining whether a first display area of a display panel operates in a public mode and whether a second display area of the display panel disposed adjacent to the first display area operates in a private mode, and outputting a data voltage of the first display area and a data voltage of the second display area, which are different from each other, for a same grayscale value when the first display area operates in the public mode and the second display area operates in the private mode. A viewing angle of a display image of the private mode is narrower than a viewing angle of a display image of the public mode.

In an embodiment, when the first display area operates in the public mode and the second display area operates in the private mode, the data voltage of the first display area is generated based on a first gamma lookup table and the data voltage of the second display area is generated based on a second gamma lookup table different from the first gamma lookup table.

In an embodiment, the method further includes outputting the data voltage of the first display area and the data voltage of the second display area, which are the same as each other, for a same grayscale value when both the first display area and the second display area operate in the public mode or both the first display area and the second display area operate in the private mode.

In an embodiment, when both the first display area and the second display area operate in the public mode, the data voltage of the first display area and the data voltage of the second display area are generated based on a first gamma lookup table. When both the first display area and the second display area operate in the private mode, the data voltage of the first display area and the data voltage of the second display area are generated based on a second gamma lookup table different from the first gamma lookup table.

In an embodiment, the method further includes determining an update driving mode and an update boundary point when the first display area operates in the public mode and the second display area operates in the private mode.

In an embodiment, the method further includes counting a data enable signal to generate a data enable count signal when a previous driving mode and the update driving mode are different from each other or a previous boundary point and the update boundary point are different from each other and a scan direction of the display panel is perpendicular to a direction in which the first display area and the second display area are adjacent to each other. When the previous driving mode and the update driving mode are different from each other or the previous boundary point and the update boundary point are different from each other, the scan direction of the display panel is perpendicular to the direction in which the first display area and the second display area are adjacent to each other and the data enable count signal is less than the update boundary point, a data voltage of a present time point is generated using a first gamma lookup table. When the previous driving mode and the update driving mode are different from each other or the previous boundary point and the update boundary point are different from each other, the scan direction of the display panel is perpendicular to the direction in which the first display area and the second display area are adjacent to each other and the data enable count signal is equal to or greater than the update boundary point, the data voltage of the present time point is generated using a second gamma lookup table different from the first gamma lookup table.

In an embodiment, the method further includes generating a gate line count signal when a previous driving mode and the update driving mode are different from each other or a previous boundary point and the update boundary point are different from each other and a scan direction of the display panel is parallel to a direction in which the first display area and the second display area are adjacent to each other. When the previous driving mode and the update driving mode are different from each other or the previous boundary point and the update boundary point are different from each other, the scan direction of the display panel is parallel to the direction in which the first display area and the second display area are adjacent to each other and the gate line count signal is less than the update boundary point, a data voltage of a present time point is generated using a first gamma lookup table. When the previous driving mode and the update driving mode are different from each other or the previous boundary point and the update boundary point are different from each other, the scan direction of the display panel is parallel to the direction in which the first display area and the second display area are adjacent to each other and the gate line count signal is equal to or greater than the update boundary point, the data voltage of the present time point is generated using a second gamma lookup table different from the first gamma lookup table.

According to an embodiment of the present inventive concept, an electronic apparatus includes a display panel, a display panel driver and a processor. The display panel includes a first display area and a second display area disposed adjacent to the first display area. The display panel driver is configured to output a data voltage of the first display area and a data voltage of the second display area, which are different from each other, for a same grayscale value when the first display area operates in a public mode and the second display area operates in a private mode. The processor is configured to output input image data and an input control signal to the display panel driver. A viewing angle of a display image of the private mode is narrower than a viewing angle of a display image of the public mode.

According to an embodiment of the present inventive concept, a method of driving the display apparatus and the electronic apparatus including the display apparatus, the data voltage of the first display area and the data voltage of the second display area, which are different from each other, may be outputted for a same grayscale value. As a result, a boundary between the first display area and the second display area may be prevented from being visible when the first display area of the display panel operates in the public mode and the second display area of the display panel operates in the private mode.

Thus, according to embodiments of the present inventive concept, the boundary between the first display area and the second display area is not visible when the first display area operates in the public mode and the second display area operates in the private mode. Therefore, the display quality of the display panel may be enhanced.

BRIEF DESCRIPTION OF THE DRAWINGS

The above and other features of the present inventive concept will become more apparent by describing in detailed embodiments thereof with reference to the accompanying drawings, in which.

DETAILED DESCRIPTION

Figure 1:
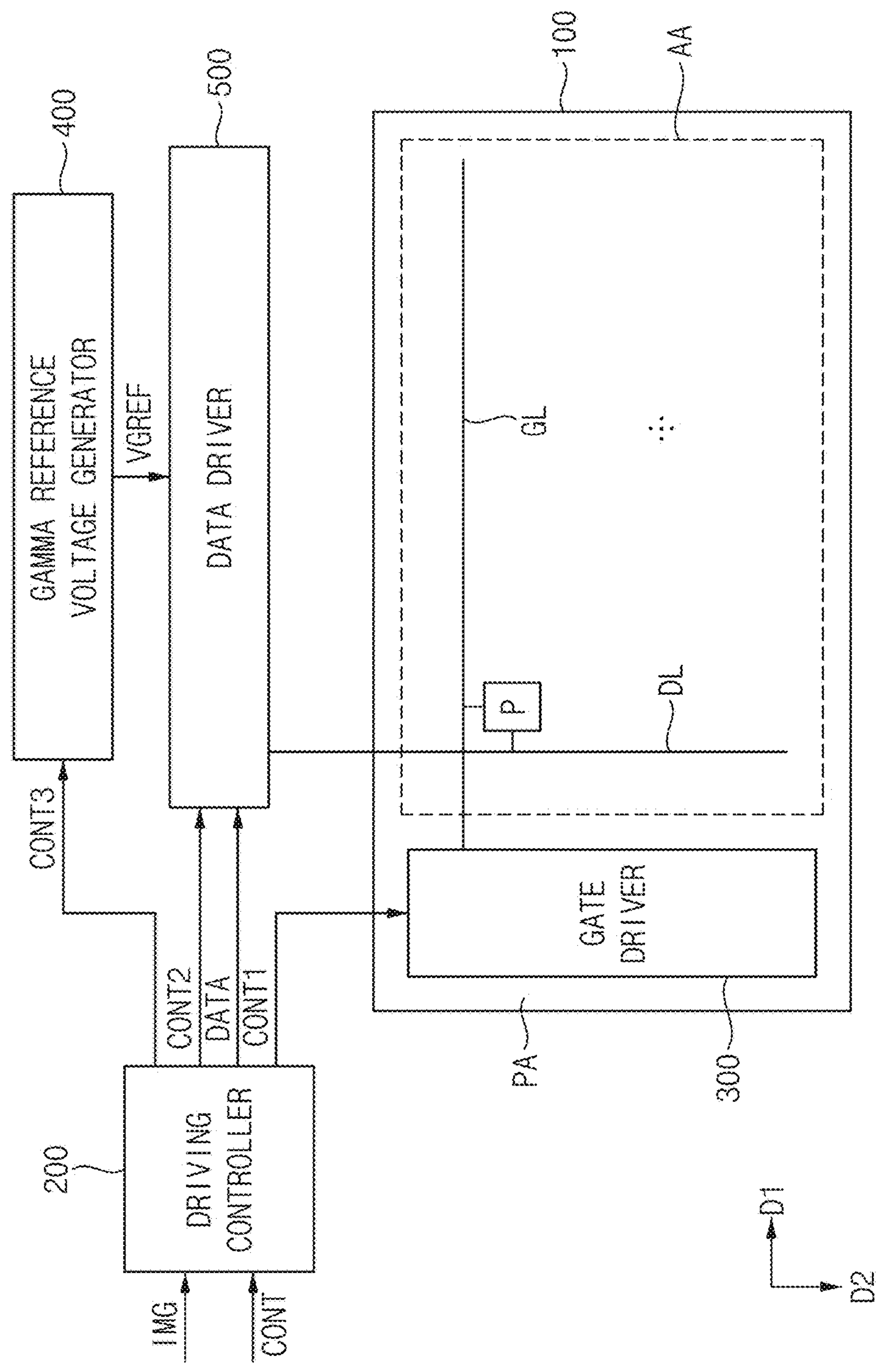
FIG. 1 is a block diagram illustrating a display apparatus according to an embodiment of the present inventive concept.

Embodiments of the present inventive concept will be described more fully hereinafter with reference to the accompanying drawings. Like reference numerals may refer to like elements throughout the accompanying drawings.

It will be understood that the terms “first,” “second,” “third,” etc. are used herein to distinguish one element from another, and the elements are not limited by these terms. Thus, a “first” element in an embodiment may be described as a “second” element in another embodiment.

It should be understood that descriptions of features or aspects within each embodiment should typically be considered as available for other similar features or aspects in other embodiments, unless the context clearly indicates otherwise.

As used herein, the singular forms “a”, “an” and “the” are intended to include the plural forms as well, unless the context clearly indicates otherwise.

It will be understood that when a component is referred to as being “on”, “connected to”, “coupled to”, or “adjacent to” another component, it can be directly on, connected, coupled, or adjacent to the other component, or intervening components may be present. It will also be understood that when a component is referred to as being “between” two components, it can be the only component between the two components, or one or more intervening components may also be present. Other words used to describe the relationships between components should be interpreted in a like fashion.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term “about” as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, “about” may mean within one or more standard deviations as understood by one of the ordinary skill in the art, for example, within ±30%, 20%, 10% or 5% of the stated value. Further, it is to be understood that while parameters may be described herein as having “about” a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

Embodiments of the present inventive concept provide a display apparatus that enhances display quality by preventing the visibility of a boundary between two adjacent display areas when operating in different modes. For example, the display panel may include a first display area operating in a public mode with a wide viewing angle and a second display area operating in a private mode with a narrow viewing angle. In such displays, a visible boundary may form between these two areas due to differences in light emission characteristics.

Embodiments of the present inventive concept may prevent such a boundary from being visible by outputting different data voltages for the first and second display areas despite having the same grayscale value. This may be implemented through the use of distinct gamma lookup tables for each area, adjusting the luminance to create a seamless transition. By allowing for the luminance of the private-mode area to be compensated for its reduced viewing angle, the display may effectively eliminate the visible boundary, resulting in an improved viewing experience, for example, in applications such as in-vehicle displays where different occupants have different viewing modes.

Embodiments of the present inventive concept further provide a method of dynamically adjusting display characteristics to balance luminance across areas with varying viewing angles.

FIG. 1 is a block diagram illustrating a display apparatus according to an embodiment of the present inventive concept.

Referring to FIG. 1, the display apparatus includes a display panel 100 and a display panel driver (also referred to as a display panel driver circuit). The display panel driver drives the display panel 100. The display panel driver includes a driving controller 200 (also referred to as a driving controller circuit), a gate driver 300 (also referred to as a gate driver circuit), a gamma reference voltage generator 400 (also referred to as a gamma reference voltage generator circuit) and a data driver 500 (also referred to as a data driver circuit).

For example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be referred to as a timing controller embedded data driver (TED) (also referred to as a timing controller embedded data driver circuit).

The display panel 100 has a display region AA in which an image is displayed and a peripheral region PA disposed adjacent to the display region AA in which an image is not displayed. The peripheral region PA may correspond to a bezel area.

The display panel 100 includes a plurality of gate lines GL, a plurality of data lines DL and a plurality of pixels P connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus (e.g., an application processor). For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronization signal and a horizontal synchronization signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 that controls an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 that controls an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 that controls an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted in the peripheral region PA of the display panel 100. For example, the gate driver 300 may be integrated in the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500.

In an embodiment, the gamma reference voltage generator 400 may be disposed in the driving controller 200 or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

In an embodiment, the gate driver 300 may be disposed adjacent to a short side of the display panel 100 (e.g., a short side relative to the other sides of the display panel 100). The data driver 500 may be disposed adjacent to a long side of the display panel 100 (e.g., a long side relative to the other sides of the display panel 100). The display panel 100 may include the gate line GL extending in an extending direction of the long side of the display panel 100 and the data line DL extending in an extending direction the short side of the display panel 100.

Figure 2:
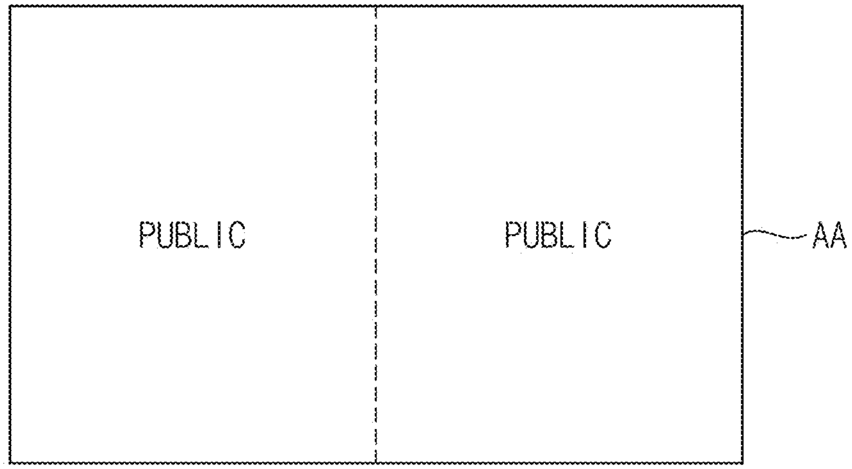
FIG. 2 is a diagram illustrating a case in which both a first display area and a second display area of a display panel of FIG. 1 operate in a public mode.
Figure 3:
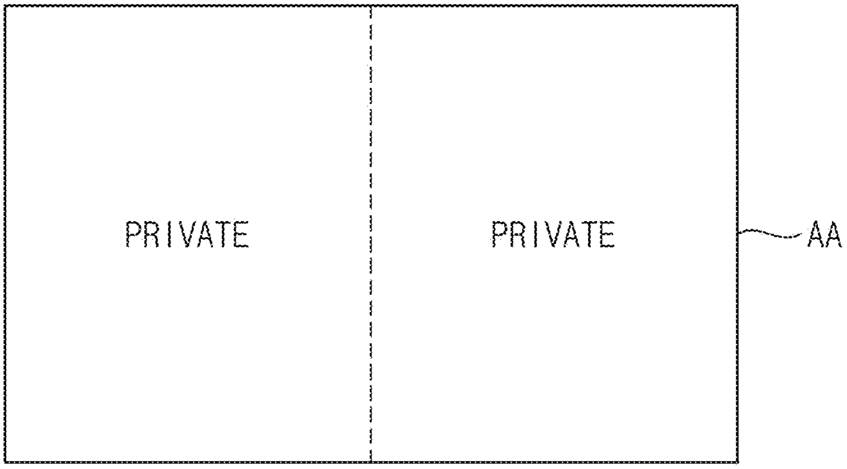
FIG. 3 is a diagram illustrating a case in which both the first display area and the second display area of the display panel of FIG. 1 operate in a private mode.
Figure 4:
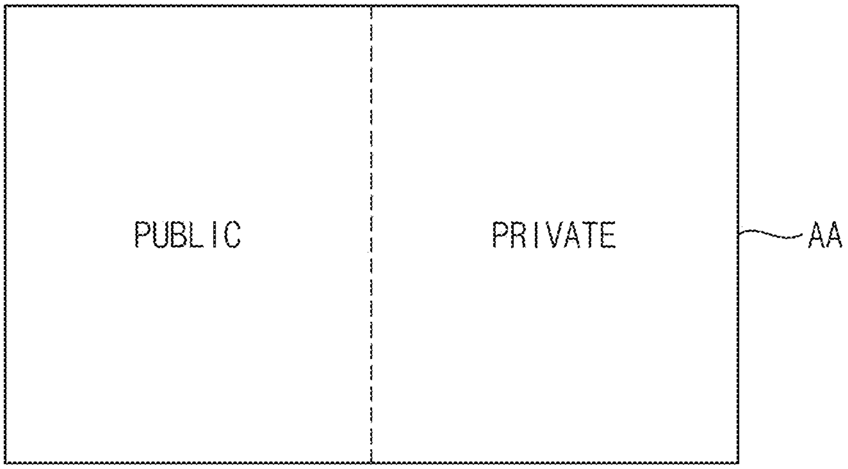
FIG. 4 is a diagram illustrating a case in which the first display area of the display panel of FIG. 1 operates in the public mode and the second display area of the display panel of FIG. 1 operates in the private mode.

FIG. 2 is a diagram illustrating a case in which both a first display area and a second display area of the display panel 100 of FIG. 1 operate in a public mode. FIG. 3 is a diagram illustrating a case in which both the first display area and the second display area of the display panel 100 of FIG. 1 operate in a private mode. FIG. 4 is a diagram illustrating a case in which the first display area of the display panel 100 of FIG. 1 operates in the public mode and the second display area of the display panel 100 of FIG. 1 operations in the private mode.

Referring to FIGS. 1 to 4, for example, the display panel 100 may be a display panel inside an automotive vehicle.

The display panel 100 may include a first display area and a second display area. For example, the display panel 100 may include the first display area and the second display area disposed adjacent to the first display area in the first direction D1.

For example, the first display area may be a driver display area of the display panel inside the automotive vehicle corresponding to a driver's seat. For example, the second display area may be a passenger display area of the display panel inside the automotive vehicle corresponding to a passenger's seat.

In FIG. 2, both the first display area and the second display area may operate in the public mode. A case in which both the first display area and the second display area operate in the public mode as shown in FIG. 2 may be referred to as an all-public mode.

In FIG. 3, both the first display area and the second display area may operate in the private mode. A case in which both the first display area and the second display area operate in the private mode as shown in FIG. 3 may be referred to as an all-private mode.

In FIG. 4, the first display area may operate in the public mode and the second display area may operate in the private mode. A case in which the first display area operates in the public mode and the second display area operates in the private mode as shown in FIG. 4 may be referred to as a partial mode.

Although the display panel 100 is divided into two display areas in FIGS. 2 to 4, the present inventive concept is not limited thereto. For example, the display panel 100 may be divided into three or more display areas according to embodiments of the present inventive concept.

A viewing angle of a display image in the private mode may be narrower than a viewing angle of a display image in the public mode. For example, in the public mode, the display area has a wide viewing angle allowing visibility even to a person located at the sides of the display area. In contrast, in the private mode, the display area has a narrow viewing angle, restricting visibility from the sides of the display area.

In an embodiment, when the first display area operates in the public mode and the second display area operates in the private mode, the display panel driver may output different data voltages for the first display area and the second display area, even for the same grayscale value. For example, in an embodiment, when the first display area operates in the public mode and the second display area operates in the private mode, the display panel driver may apply different data voltages to the first and second display areas, even when they correspond to the same grayscale value. This adjustment compensates for differences in viewing angles and luminance characteristics between the public and private modes. For example, because the private mode restricts the viewing angle and may result in reduced perceived brightness, the data voltage of the second display area may be increased relative to the first display area to provide uniform luminance across the display. By dynamically modifying the data voltages based on the display mode of each area, embodiments of the present inventive concept may prevent a visible boundary from forming between the two regions, thereby improving overall display quality and providing a seamless viewing experience.

Figure 5:
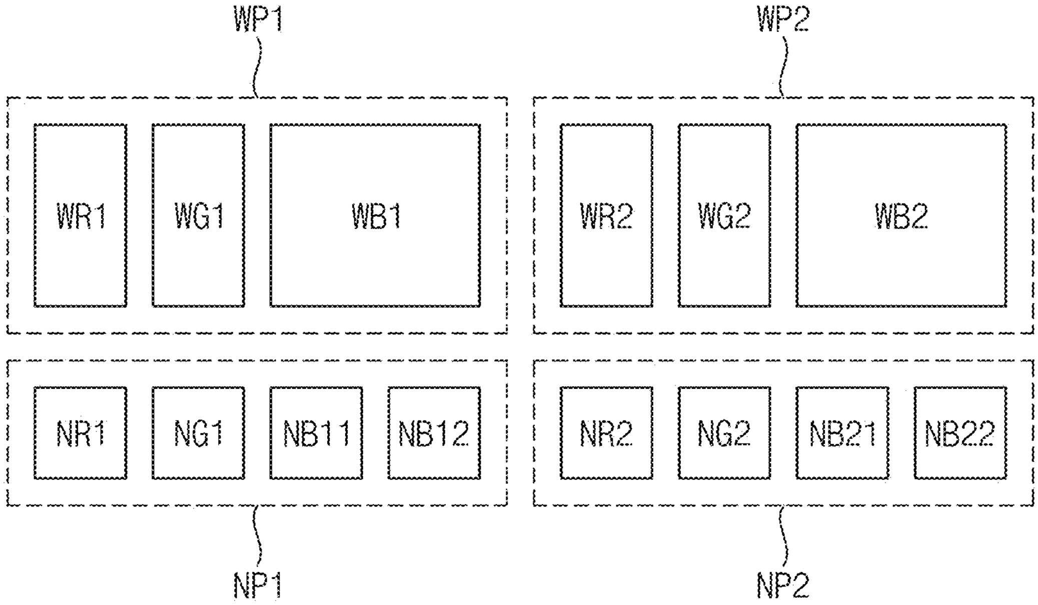
FIG. 5 is a diagram illustrating a pixel of the display panel of FIG. 1.
Figure 6:
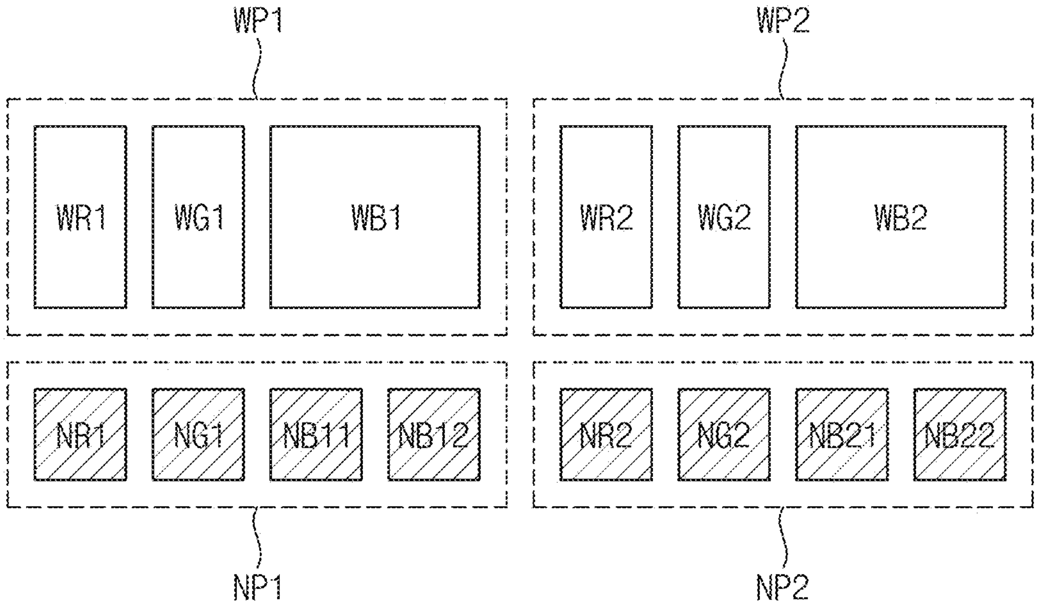
FIG. 6 is a diagram illustrating the pixel of the display panel of FIG. 1 in the public mode.
Figure 7:
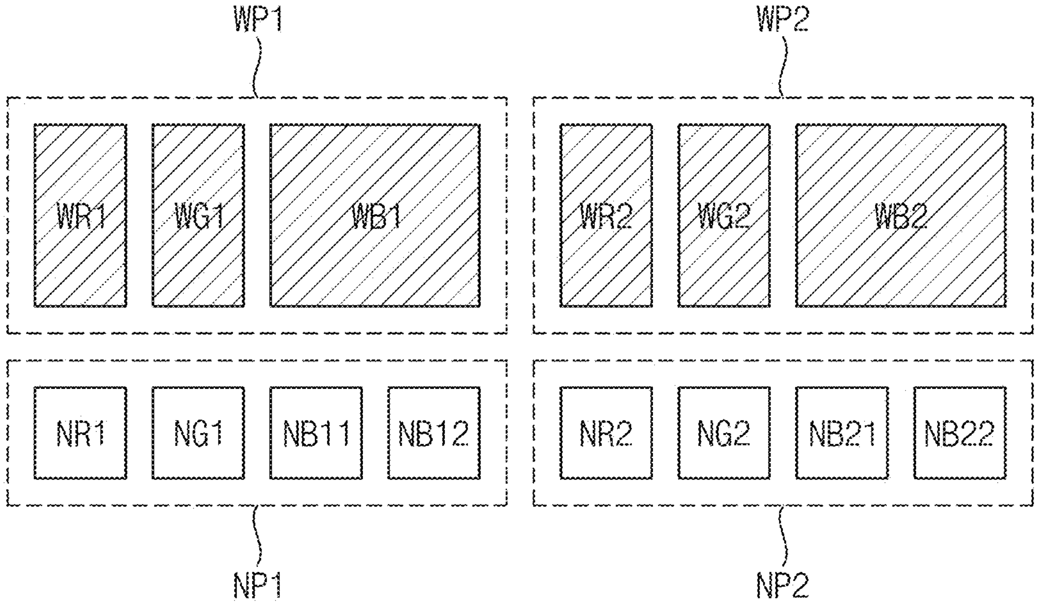
FIG. 7 is a diagram illustrating the pixel of the display panel of FIG. 1 in the private mode.

FIG. 5 is a diagram illustrating a pixel of the display panel 100 of FIG. 1. FIG. 6 is a diagram illustrating the pixel of the display panel 100 of FIG. 1 in the public mode. FIG. 7 is a diagram illustrating the pixel of the display panel 100 of FIG. 1 in the private mode.

Referring to FIGS. 1 to 7, the display panel may include normal pixels WP1 and WP2 and viewing angle control pixels NP1 and NP2. A viewing angle of each of the viewing angle control pixels NP1 and NP2 may be narrower than a viewing angle of each of the normal pixels WP1 and WP2.

The viewing angle control pixels NP1 and NP2 may each be a private pixel used in the private mode. Each of the normal pixels WP1 and WP2 may be referred to as a wide pixel. Each of the viewing angle control pixels NP1 and NP2 may be referred to as a narrow pixel.

A side luminance of each of the viewing angle control pixels NP1 and NP2 perceived by a user from a side may be lower than a front luminance of each of the viewing angle control pixels NP1 and NP2 perceived by a user from a front. For example, each of the viewing angle control pixels NP1 and NP2 may include a light blocking pattern disposed in a light-emitting area. Due to the light blocking pattern, the side luminance of each of the viewing angle control pixels NP1 and NP2 may be perceived to be lower than the front luminance of each of the viewing angle control pixels NP1 and NP2.

A front luminance of each of the normal pixels WP1 and WP2 perceived by a user from a front may be substantially the same as a front luminance of each of the viewing angle control pixels NP1 and NP2 perceived by a user from a front. A side luminance of each of the normal pixels WP1 and WP2 perceived by a user from a side may be higher than a side luminance of each of the viewing angle control pixels NP1 and NP2 perceived by a user from a side.

The front luminance of each of the normal pixels WP1 and WP2 may be substantially the same as the side luminance of each of the normal pixels WP1 and WP2. In contrast, the front luminance of each of the viewing angle control pixels NP1 and NP2 may be higher than the side luminance of each of the viewing angle control pixels NP1 and NP2. For example, the side luminance of each of the viewing angle control pixels NP1 and NP2 may be equal to or lower than half of the front luminance of each of the viewing angle control pixels NP1 and NP2.

In an embodiment, each of the normal pixels WP1 and WP2 may be turned on and each of the viewing angle control pixels NP1 and NP2 may be turned off in the public mode as shown in FIG. 6. Each of the normal pixels WP1 and WP2 may be turned off and each of the viewing angle control pixels NP1 and NP2 may be turned on in the private mode as shown in FIG. 7.

A size of a light-emitting area of a subpixel of each of the viewing angle control pixels NP1 and NP2 may be smaller than a size of a light-emitting area of a subpixel of each of the normal pixels WP1 and WP2.

For example, the display panel 100 may include a first color first normal subpixel WR1, a second color first normal subpixel WG1 and a third color first normal subpixel WB1 which are sequentially disposed in a first pixel row, and a first color first viewing angle control subpixel NR1, a second color first viewing angle control subpixel NG1, a third color 1-1 viewing angle control subpixel NB11 and a third color 1-2 viewing angle control subpixel NB12 which are sequentially disposed in a second pixel row.

For example, a size of a light-emitting area of the first color first normal subpixel WR1 may be larger than a size of a light-emitting area of the first color first viewing angle control subpixel NR1. A size of a light-emitting area of the second color first normal subpixel WG1 may be larger than a size of a light-emitting area of the second color first viewing angle control subpixel NG1. A size of a light-emitting area of the third color first normal subpixel WB1 may be larger than a sum of a size of a light-emitting area of the third color 1-1 viewing angle control subpixel NB11 and a size of a light-emitting area of the third color 1-2 viewing angle control subpixel NB12.

Similarly, the display panel 100 may further include a first color second normal subpixel WR2, a second color second normal subpixel WG2 and a third color second normal subpixel WB2 which are sequentially disposed in the first pixel row, and a first color second viewing angle control subpixel NR2, a second color second viewing angle control subpixel NG2, a third color 2-1 viewing angle control subpixel NB21 and a third color 2-2 viewing angle control subpixel NB22 which are sequentially disposed in the second pixel row.

For example, a size of a light-emitting area of the first color second normal subpixel WR2 may be larger than a size of a light-emitting area of the first color second viewing angle control subpixel NR2. A size of a light-emitting area of the second color second normal subpixel WG2 may be larger than a size of a light-emitting area of the second color second viewing angle control subpixel NG2. A size of a light-emitting area of the third color second normal subpixel WB2 may be larger than a sum of a size of a light-emitting area of the third color 2-1 viewing angle control subpixel NB21 and a size of a light-emitting area of the third color 2-2 viewing angle control subpixel NB22.

Figure 8A:
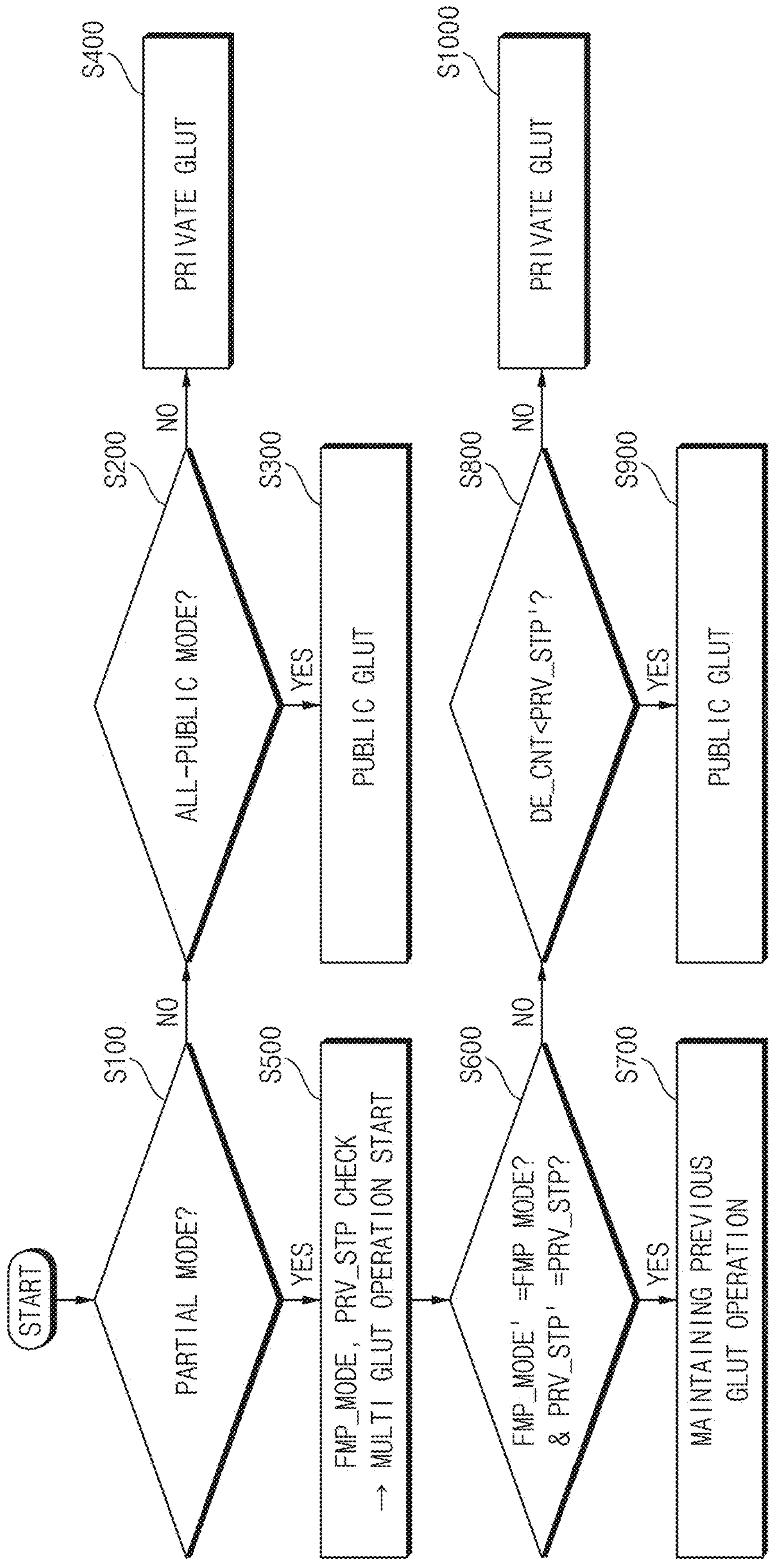
FIG. 8A is a flowchart illustrating a method of driving the display apparatus of FIG. 1.
Figure 8B:
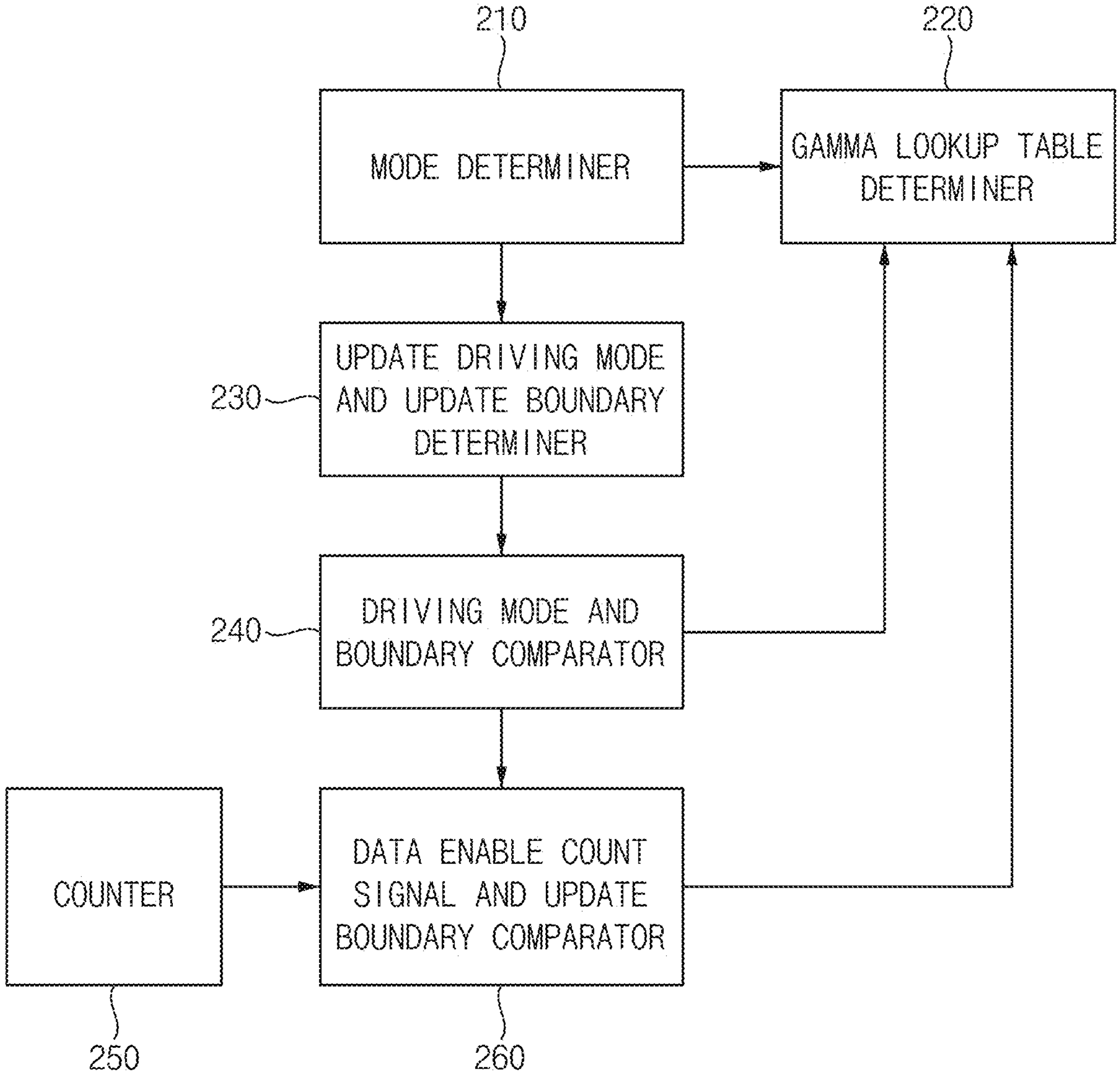
FIG. 8B is a block diagram illustrating a driving controller of FIG. 1.
Figure 9:
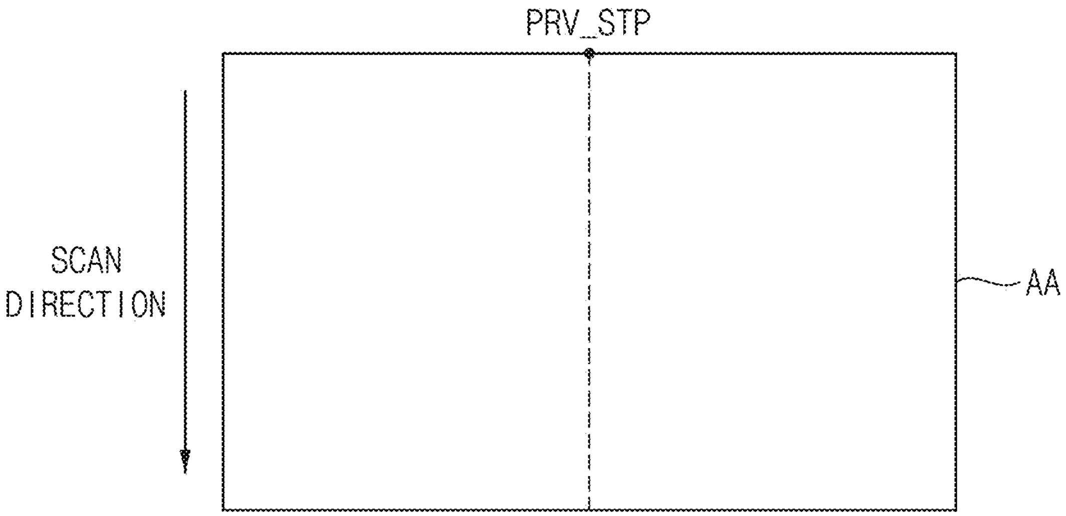
FIG. 9 is a diagram illustrating a boundary point between the first display area and the second display area of the display panel of FIG. 1 and a scan direction of the display panel of FIG. 1.
Figure 10:
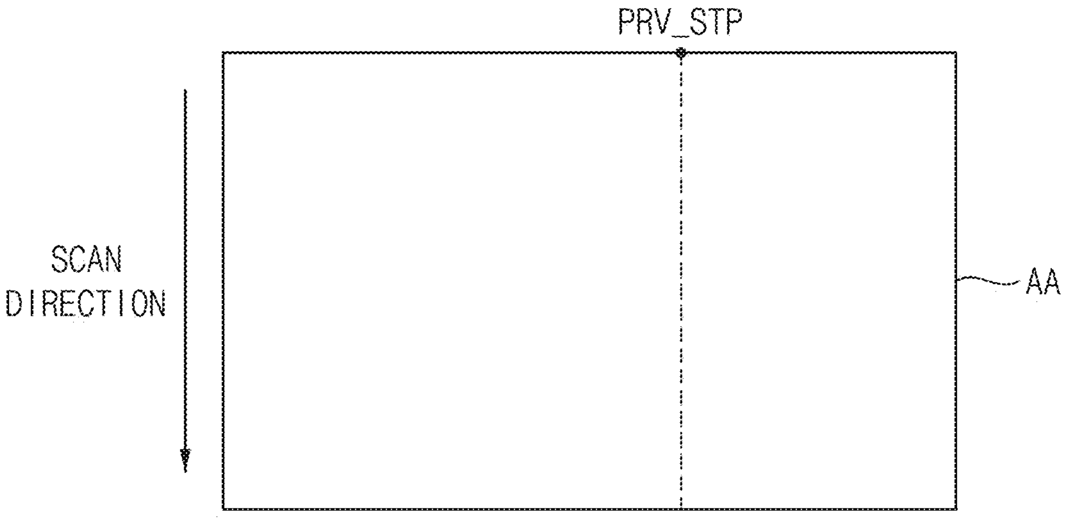
FIG. 10 is a diagram illustrating the boundary point between the first display area and the second display area of the display panel of FIG. 1 and the scan direction of the display panel of FIG. 1.
Figure 11:
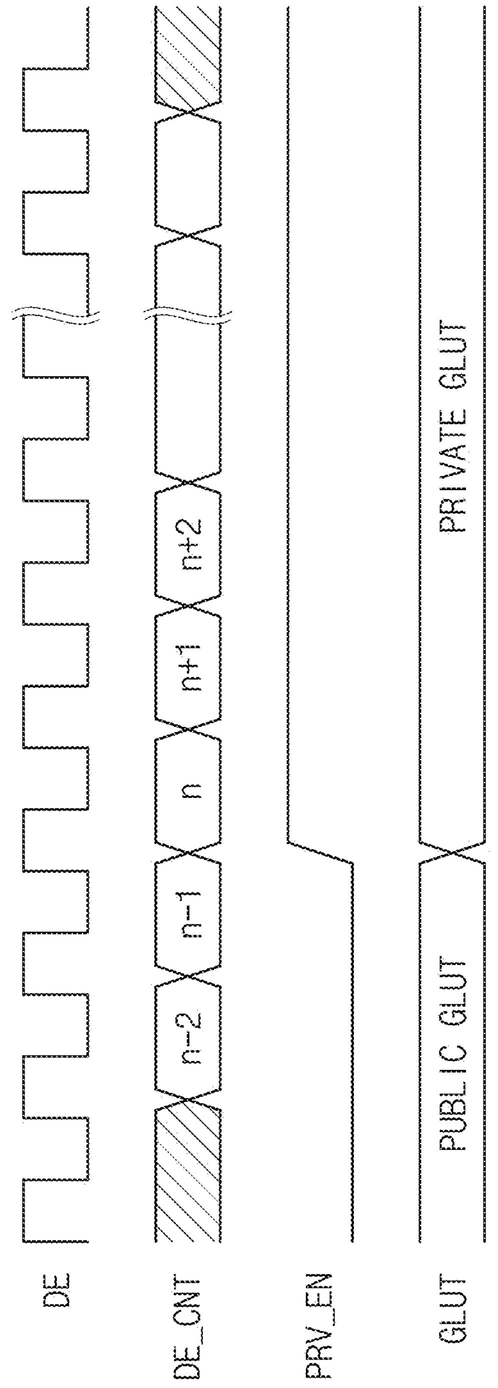
FIG. 11 is a timing diagram illustrating a data enable count signal of an operation S800 of FIG. 8A.

FIG. 8A is a flowchart illustrating a method of driving the display apparatus of FIG. 1. FIG. 8B is a block diagram illustrating the driving controller 200 of FIG. 1. FIG. 9 is a diagram illustrating a boundary point PRV_STP disposed between the first display area and the second display area of the display panel 100 of FIG. 1 and a scan direction of the display panel 100 of FIG. 1. FIG. 10 is a diagram illustrating the boundary point PRV_STP disposed between the first display area and the second display area of the display panel 100 of FIG. 1 and the scan direction of the display panel 100 of FIG. 1. FIG. 11 is a timing diagram illustrating a data enable count signal DE_CNT of an operation S800 of FIG. 8A.

Referring to FIGS. 1 to 11, a method of driving the display apparatus according to an embodiment of the present inventive concept includes determining whether the first display area of the display panel 100 operates in the public mode and whether the second display area disposed adjacent to the first display area operates in the private mode (operation S100), and outputting the data voltage of the first display area and the data voltage of the second display area, which are different from each other for the same grayscale value (operations S600, S800, S900 and S1000), when the first display area operates in the public mode and the second display area operates in the private mode.

For example, according to an embodiment of the present inventive concept, the display panel includes the first display area and the second display area disposed adjacent to the first display area. The display panel driver may be configured to output a first data voltage to the first display area and a second data voltage to the second display area. When the first display area operates in the public mode and the second display area operates in the private mode, the first data voltage is different from the second data voltage for the same grayscale value, and the viewing angle of a display image displayed in the private mode is narrower than a viewing angle of a display image displayed in the public mode.

For example, the driving controller 200 may include a mode determiner 210 (also referred to as a mode determiner circuit), a gamma lookup table determiner 220 (also referred to as a gamma lookup table determiner circuit), an update driving mode and update boundary determiner 230 (also referred to as an update driving mode and update boundary determiner circuit), a driving mode and boundary comparator 240 (also referred to as a driving mode and boundary comparator circuit), a counter 250 (also referred to as a counter circuit) and a data enable count signal and update boundary comparator 260 (also referred to as a data enable count signal and update boundary comparator circuit).

When the first display area operates in the public mode and the second display area operates in the private mode, the data voltage of the first display area may be generated based on a first gamma lookup table PUBLIC GLUT and the data voltage of the second display area may be generated based on a second gamma lookup table PRIVATE GLUT, which is different from the first gamma lookup table PUBLIC GLUT.

A size or a shape of a light-emitting area of a pixel in the public mode may be different from a size or a shape of a light-emitting area of a pixel in the private mode. Accordingly, when the driver display area operates in the public mode and the passenger display area operates in the private mode, a boundary between the driver display area and the passenger display area may be shown.

As shown in FIG. 5, the size of the light-emitting area of the subpixel of the viewing angle control pixels NP1 and NP2 may be smaller than the size of the light-emitting area of the subpixel of the normal pixels WP1 and WP2. Thus, when the first display area operates in the public mode and the second display area operates in the private mode, both areas receive the same data voltage for the same grayscale value (e.g., the data voltage output by the display panel driver to the first display area and the data voltage output by the display panel driver to the second display area are about equal to each other for the same grayscale value), the normal pixels WP1 and WP2 may be relatively brighter than the viewing angle control pixels NP1 and NP2, making the boundary between the first display area and the second display area clearly visible.

Accordingly, a unit area luminance represented by a gamma reference voltage of the second gamma lookup table PRIVATE GLUT applied to the viewing angle control pixels NP1 and NP2 may be higher than a unit area luminance represented by a gamma reference voltage of the first gamma lookup table PUBLIC GLUT applied to the normal pixels WP1 and WP2 for a same grayscale value.

When both the first display area and the second display area operate in the public mode or both the first display area and the second display area operate in the private mode, the display panel driver may output the same data voltage to both the first display area and the second display area for the same grayscale value (e.g., the data voltage output by the display panel driver to the first display area and the data voltage output by the display panel driver to the second display area are about equal to each other for the same grayscale value).

For example, when the first display area and the second display area do not operate in the partial mode, it is determined whether the first display area and the second display area operate in the public mode (operation S200).

For example, the mode determiner 210 may determine whether the first display area and the second display area do not operate in the partial mode and whether the first display area and the second display area operate in the public mode.

In the all-public mode in which the first display area and the second display area operate in the public mode, the data voltage of the first display area and the data voltage of the second display area may be generated based on the first gamma lookup table PUBLIC GLUT (operation S300).

For example, the gamma lookup table determiner 220 may determine a gamma lookup table such that the data voltage of the first display area and the data voltage of the second display area are generated based on the first gamma lookup table PUBLIC GLUT.

In the all-private mode in which the first display area and the second display area operate in the private mode, the data voltage of the first display area and the data voltage of the second display area may be generated based on the second gamma lookup table PRIVATE GLUT (operation S400).

For example, the gamma lookup table determiner 220 may determine a gamma lookup table such that the data voltage of the first display area and the data voltage of the second display area are generated based on the second gamma lookup table PRIVATE GLUT.

When the first display area operates in the public mode and the second display area operates in the private mode, the display panel driver may determine an update driving mode FMP_MODE' and an update boundary point PRV_STP' (operation S500).

For example, when the first display area operates in the public mode and the second display area operates in the private mode, the update driving mode and update boundary determiner 230 may determine the update driving mode FMP_MODE' and the update boundary point PRV_STP'.

After the update driving mode FMP_MODE' and the update boundary point PRV_STP' are determined, a multi-gamma lookup table operation may start.

When a previous driving mode FMP_MODE and the update driving mode FMP_MODE' are the same and a previous boundary point PRV_STP and the update boundary point PRV_STP' are the same (operation S600), the display panel driver may maintain a previous gamma lookup table (operation S700).

For example, the driving mode and boundary comparator 240 may determine whether the previous driving mode FMP_MODE and the update driving mode FMP_MODE' are the same and whether the previous boundary point PRV_STP and the update boundary point PRV_STP' are the same. For example, when the previous driving mode FMP_MODE and the update driving mode FMP_MODE' are the same and the previous boundary point PRV_STP and the update boundary point PRV_STP' are the same (operation S600), the gamma lookup table determiner 220 may determine the gamma lookup table such that the previous gamma lookup table is maintained.

Herein, the previous driving mode FMP_MODE may mean a driving mode immediately before the update driving mode FMP_MODE' is generated and the previous boundary point PRV_STP may mean a boundary point immediately before the update boundary point PRV_STP' is generated.

Each of the previous driving mode FMP_MODE and the update driving mode FMP_MODE' may be one of the all-public mode, the all-private mode and the partial mode.

Each of the previous boundary point PRV_STP and the update boundary point PRV_STP' may mean a boundary point disposed between the first display area (e.g., the driver display area) and the second display area (e.g., the passenger display area). The boundary point disposed between the first display area (e.g., the driver display area) and the second display area (e.g., the passenger display area) may vary according to a setting. For example, in a direction from left to right of the display panel 100 in the partial mode, a display area before passing the previous boundary point PRV_STP and the update boundary point PRV_STP' may be in the public mode and a display area after passing the previous boundary point PRV_STP and the update boundary point PRV_STP' may be in the private mode. In other words, a private mode enable signal PRV_EN may be activated at the update boundary point PRV_STP'.

When the previous driving mode FMP_MODE and the update driving mode FMP_MODE' are different from each other or the previous boundary point PRV_STP and the update boundary point PRV_STP' are different from each other (operation S600), and the scan direction of the display panel 100 is perpendicular to a direction in which the first display area and the second display area are adjacent to each other, as shown in FIGS. 9 and 10, the display panel driver may count a data enable signal DE to generate a data enable count signal DE_CNT (operation S800). Herein, the data enable count signal DE_CNT may mean a pixel count in the direction (e.g., the first direction D1 in FIG. 1) in which the first display area and the second display area are adjacent to each other. Herein, the previous boundary point PRV_STP and the update boundary point PRV_STP' may mean a pixel count corresponding to the boundary point disposed between the first display area and the second display area.

For example, the counter 250 may count the data enable signal DE to generate the data enable count signal DE_CNT.

When the previous driving mode FMP_MODE and the update driving mode FMP_MODE' are different from each other or the previous boundary point PRV_STP and the update boundary point PRV_STP' are different from each other (operation S600), the scan direction of the display panel 100 is perpendicular to the direction in which the first display area and the second display area are adjacent to each other and the data enable count signal DE_CNT is less than the update boundary point PRV_STP', a data voltage of a present time point may be generated using the first gamma lookup table PUBLIC GLUT (operation S900).

For example, the data enable count signal and update boundary comparator 260 may determine whether the data enable count signal DE_CNT is less than the update boundary point PRV_STP'. For example, when the previous driving mode FMP_MODE and the update driving mode FMP_MODE' are different from each other or the previous boundary point PRV_STP and the update boundary point PRV_STP' are different from each other (operation S600), the scan direction of the display panel 100 is perpendicular to the direction in which the first display area and the second display area are adjacent to each other and the data enable count signal DE_CNT is less than the update boundary point PRV_STP', the gamma lookup table determiner 220 may determine the gamma lookup table such that the data voltage of the present time point is generated using the first gamma lookup table PUBLIC GLUT.

When the previous driving mode FMP_MODE and the update driving mode FMP_MODE' are different from each other or the previous boundary point PRV_STP and the update boundary point PRV_STP' are different from each other, the scan direction of the display panel 100 is perpendicular to the direction in which the first display area and the second display area are adjacent to each other and the data enable count signal DE_CNT is equal to or greater than the update boundary point PRV_STP', the data voltage of the present time point may be generated using the second gamma lookup table PRIVATE GLUT (operation S1000).

For example, when the previous driving mode FMP_MODE and the update driving mode FMP_MODE' are different from each other or the previous boundary point PRV_STP and the update boundary point PRV_STP' are different from each other, the scan direction of the display panel 100 is perpendicular to the direction in which the first display area and the second display area are adjacent to each other and the data enable count signal DE_CNT is equal to or greater than the update boundary point PRV_STP', the gamma lookup table determiner 220 may determine the gamma lookup table such that the data voltage of the present time point is generated using the second gamma lookup table PRIVATE GLUT.

According to an embodiment, the data voltage of the first display area and the data voltage of the second display area, which are different from each other, may be outputted for a same grayscale value to prevent a boundary between the first display area and the second display area from being shown when the first display area of the display panel 100 operates in the public mode and the second display area of the display panel 100 operates in the private mode.

Thus, according to embodiments, the boundary between the first display area and the second display area is not visible when the first display area operates in the public mode and the second display area operates in the private mode. Therefore, the display quality of the display panel 100 may be enhanced.

Figure 12:
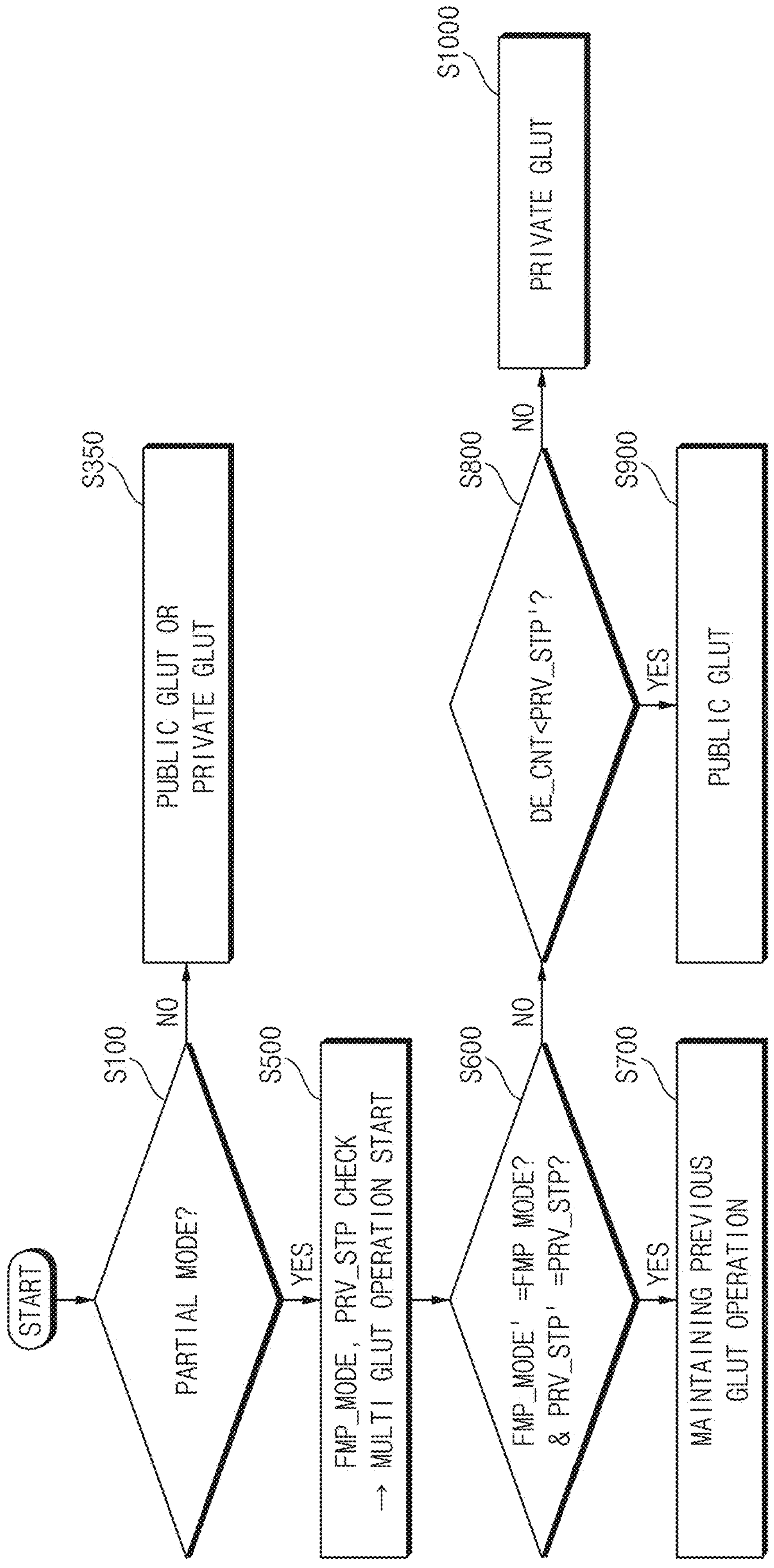
FIG. 12 is a flowchart illustrating a method of driving a display apparatus according to an embodiment of the present inventive concept.

FIG. 12 is a flowchart illustrating a method of driving a display apparatus according to an embodiment of the present inventive concept.

The display apparatus and the method of driving the display apparatus according to an embodiment described with reference to FIG. 12 are substantially the same as the display apparatus and the method of driving the display apparatus of according to an embodiment described with reference to FIGS. 1 to 11, except for an operation of the display panel driver not in the partial mode. Thus, the same reference numerals will be used to refer to the same or like parts as those described with reference to FIGS. 1 to 11 and any repetitive explanation concerning the above elements will be omitted.

Referring to FIG. 12, the method of driving the display apparatus includes determining whether the first display area of the display panel 100 operates in the public mode and whether the second display area adjacent to the first display area operates in the private mode (operation S100), and outputting different data voltages for the first display area and the second display area for a same grayscale value (operations S600, S800, S900 and S1000), when the first display area operates in the public mode and the second display area operates in the private mode.

When the first display area and the second display area do not operate in the partial mode, the data voltage of the first display area and the data voltage of the second display area may be generated based on the first gamma lookup table PUBLIC GLUT or the second gamma lookup table PRIVATE GLUT (operation S350).

According to an embodiment, the data voltage output for the first display area and the data voltage output for the second display area, which are different from each other, may be outputted for a same grayscale value to prevent a boundary between the first display area and the second display area from being shown when the first display area of the display panel 100 operates in the public mode and the second display area of the display panel 100 operates in the private mode.

Thus, according to embodiments, the boundary between the first display area and the second display area is not visible when the first display area operates in the public mode and the second display area operates in the private mode. Therefore, the display quality of the display panel 100 may be enhanced.

Figure 13:
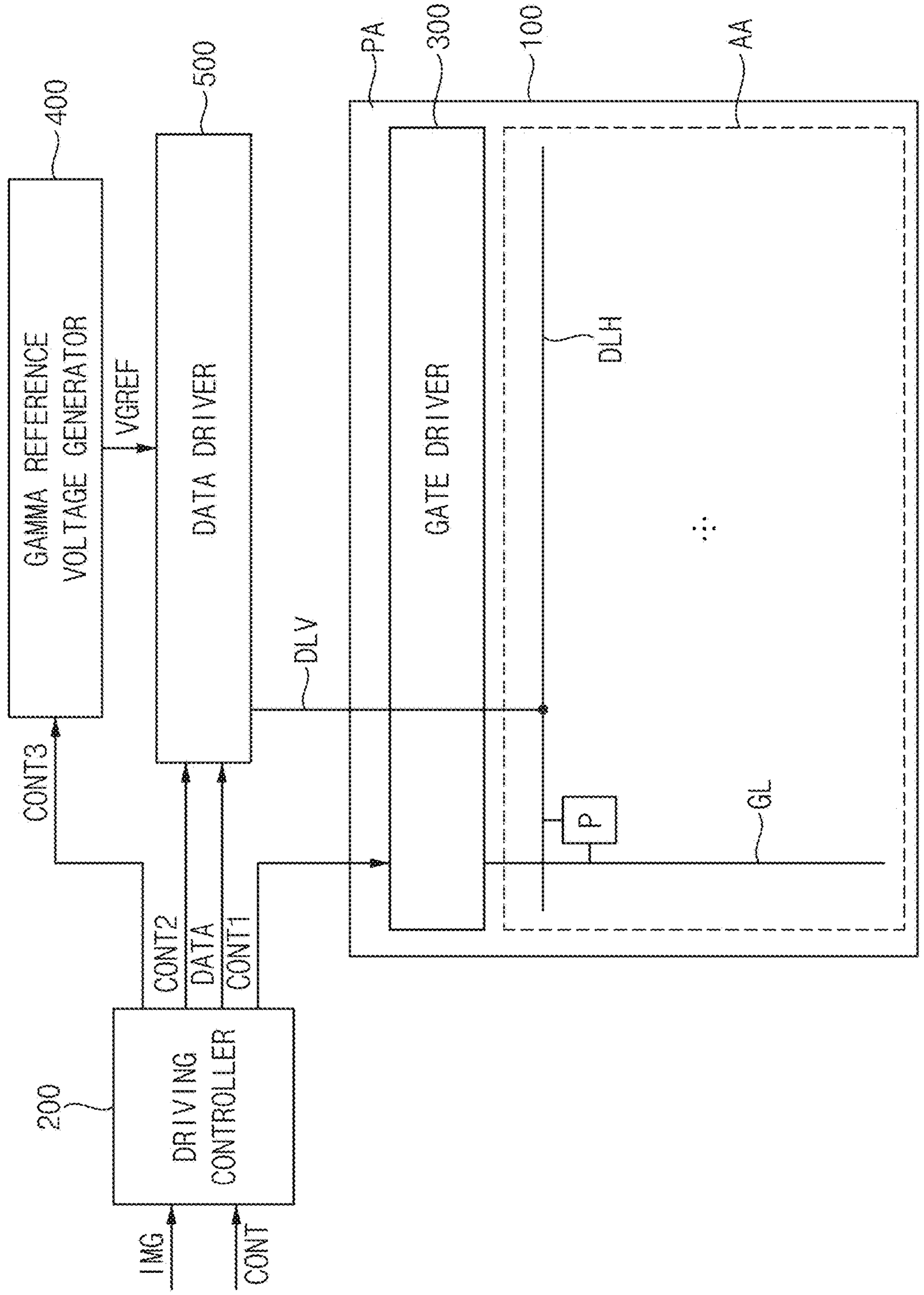
FIG. 13 is a block diagram illustrating a display apparatus according to an embodiment of the present inventive concept.
Figure 14:
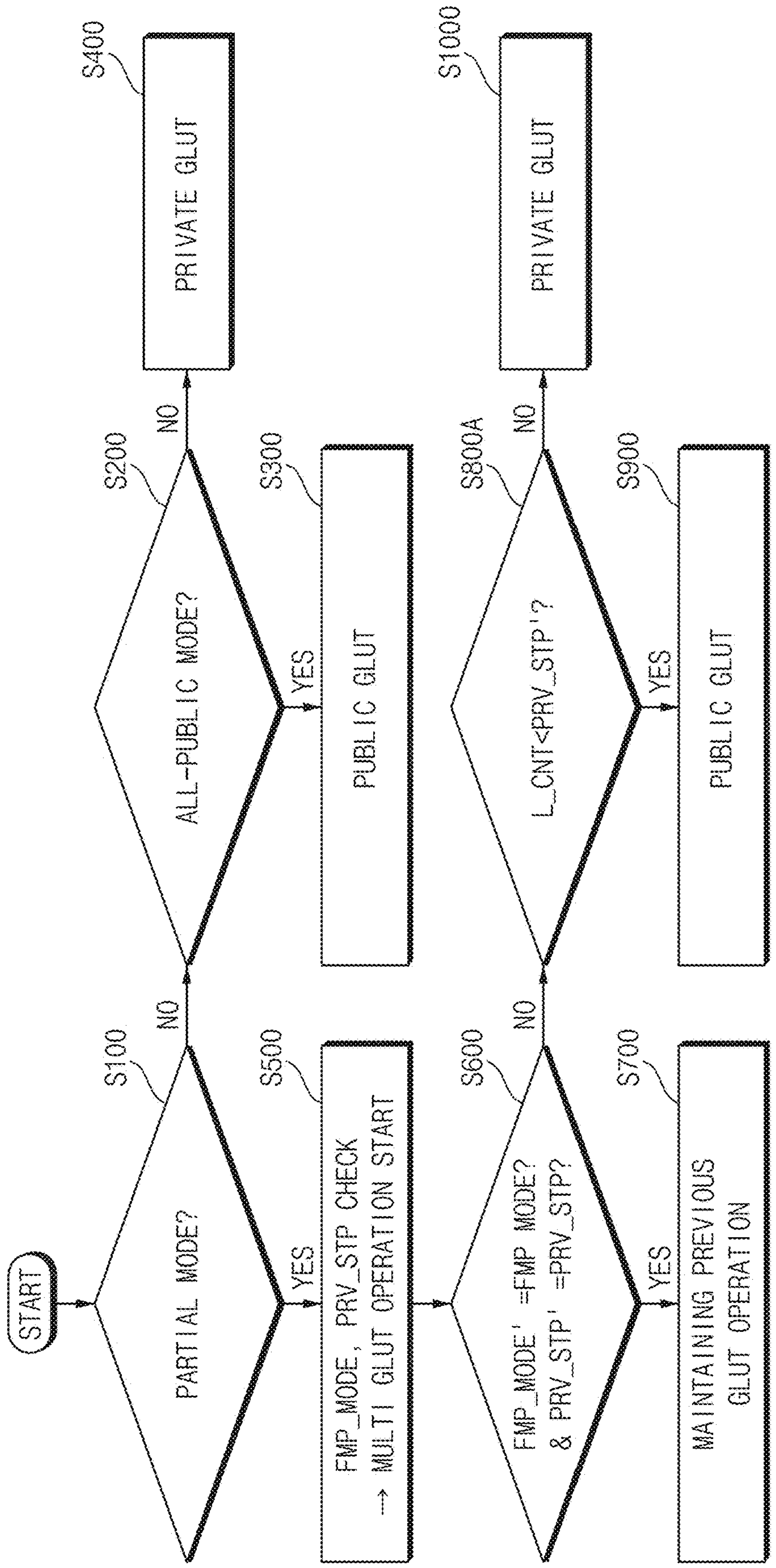
FIG. 14 is a flowchart illustrating a method of driving the display apparatus of FIG. 13.

FIG. 13 is a block diagram illustrating a display apparatus according to an embodiment of the present inventive concept.

The display apparatus according to an embodiment is substantially the same as the display apparatus described with reference to FIGS. 1 to 11, except that the gate driver and the data driver are disposed at a same side with respect to the display region of the display panel. Thus, the same reference numerals will be used to refer to the same or like parts as those described with reference to FIGS. 1 to 11 and any repetitive explanation concerning the above elements will be omitted.

Referring to FIG. 13, in an embodiment, the gate driver 300 may be disposed adjacent to a (relatively) longer side of the display panel 100. The data driver 500 may be disposed adjacent to the (relatively) longer side of the display panel 100. The display panel 100 may include a gate line GL extending in an extending direction of a (relatively) shorter side of the display panel 100, a first data line DLH extending in an extending direction along the (relatively) longer side of the display panel 100 and a second data line DLV extending in the extending direction along the (relatively) shorter side of the display panel 100.

Although the gate driver 300 is disposed at an upper portion of a peripheral region of the display panel 100 and the data driver 500 is disposed adjacent to an upper side of the display panel 100, the present inventive concept is not limited thereto. For example, in an embodiment, the gate driver 300 may be disposed at a lower portion of the peripheral region of the display panel 100 or the gate driver 300 may be disposed at the upper portion and the lower portion of the peripheral region of the display panel 100. In addition, the data driver 500 may be disposed adjacent to a lower side of the display panel 100 or the data driver 500 may be disposed adjacent to the upper side and the lower side of the display panel 100.

For example, the display panel 100 may be a display panel inside an automotive vehicle.

The display panel 100 may include a first display area and a second display area. For example, the display panel 100 may include the first display area and the second display area disposed adjacent to the first display area in the first direction D1.

For example, the first display area may be a driver display area of the display panel inside the automotive vehicle corresponding to a driver's seat. For example, the second display area may be a passenger display area of the display panel inside the automotive vehicle corresponding to a passenger's seat.

The method of driving the display apparatus includes determining whether the first display area of the display panel 100 operates in the public mode and whether the second display area adjacent to the first display area operates in the private mode (operation S100), and outputting different data voltages for the first display area and the second display area for a same grayscale value (operations S600, S800A, S900 and S1000) when the first display area operates in the public mode and the second display area operates in the private mode.

When the first display area operates in the public mode and the second display area operates in the private mode, the display panel driver may determine an update driving mode FMP_MODE' and an update boundary point PRV_STP' (operation S500). After the update driving mode FMP_MODE' and the update boundary point PRV_STP' are determined, a multi-gamma lookup table operation may start.

When a previous driving mode FMP_MODE and the update driving mode FMP_MODE' are the same and a previous boundary point PRV_STP and the update boundary point PRV_STP' are the same (operation S600), the display panel driver may maintain a previous gamma lookup table (operation S700).

Figure 15:
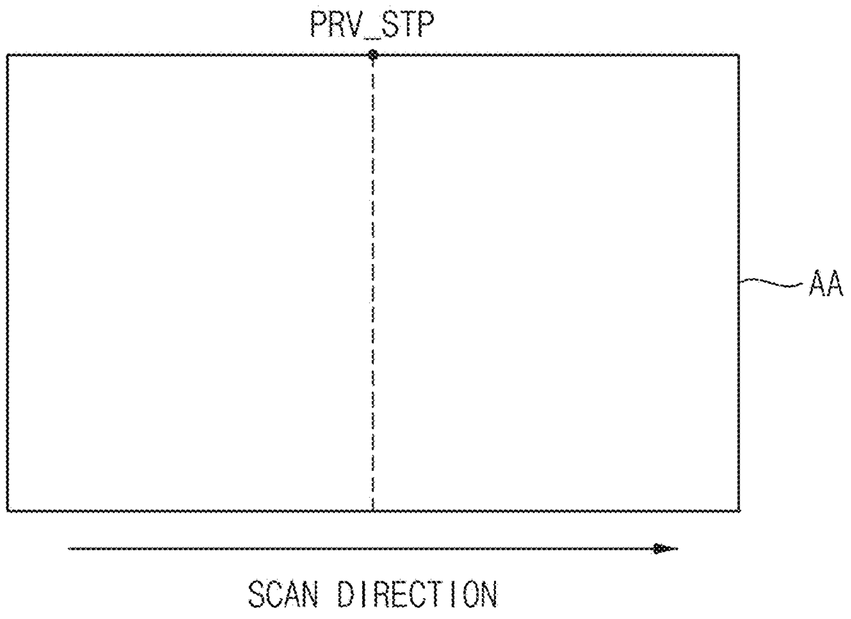
FIG. 15 is a diagram illustrating a boundary point between a first display area and a second display area of a display panel of FIG. 13 and a scan direction of the display panel of FIG. 13.
Figure 16:
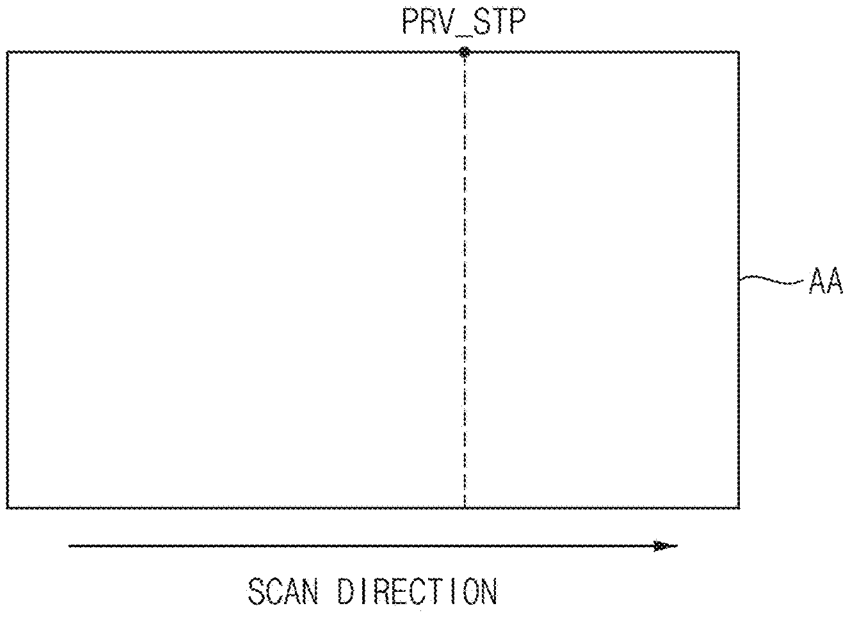
FIG. 16 is a diagram illustrating a boundary point between the first display area and the second display area of the display panel of FIG. 13 and the scan direction of the display panel of FIG. 13.

When the previous driving mode FMP_MODE and the update driving mode FMP_MODE' are different from each other or the previous boundary point PRV_STP and the update boundary point PRV_STP' are different from each other (operation S600) and the scan direction of the display panel 100 is parallel to a direction in which the first display area and the second display area are adjacent to each other as shown in FIGS. 15 and 16, the display panel driver may generate a gate line count signal L_CNT (operation S800A). Herein, the gate line count signal L_CNT may mean a pixel count or a gate line count in the direction (e.g., the first direction D1 in FIG. 1) in which the first display area and the second display area are adjacent to each other. Herein, the previous boundary point PRV_STP and the update boundary point PRV_STP' may mean a pixel count or a gate line count corresponding to the boundary point disposed between the first display area and the second display area.

When the previous driving mode FMP_MODE and the update driving mode FMP_MODE' are different from each other or the previous boundary point PRV_STP and the update boundary point PRV_STP' are different from each other (operation S600), the scan direction of the display panel 100 is parallel to the direction in which the first display area and the second display area are adjacent to each other and the gate line count signal L_CNT is less than the update boundary point PRV_STP', a data voltage of a present time point may be generated using the first gamma lookup table PUBLIC GLUT (operation S900).

When the previous driving mode FMP_MODE and the update driving mode FMP_MODE' are different from each other or the previous boundary point PRV_STP and the update boundary point PRV_STP' are different from each other, the scan direction of the display panel 100 is parallel to the direction in which the first display area and the second display area are adjacent to each other and the gate line count signal L_CNT is equal to or greater than the update boundary point PRV_STP', the data voltage of the present time point may be generated using the second gamma lookup table PRIVATE GLUT (operation S1000).

According to an embodiment, the data voltage of the first display area and the data voltage of the second display area, which are different from each other, may be outputted for a same grayscale value to prevent a boundary between the first display area and the second display area from being shown when the first display area of the display panel 100 operates in the public mode and the second display area of the display panel 100 operates in the private mode.

Thus, according to embodiments, the boundary between the first display area and the second display area is not visible when the first display area operates in the public mode and the second display area operates in the private mode. Therefore, the display quality of the display panel 100 may be enhanced.

Figure 17:
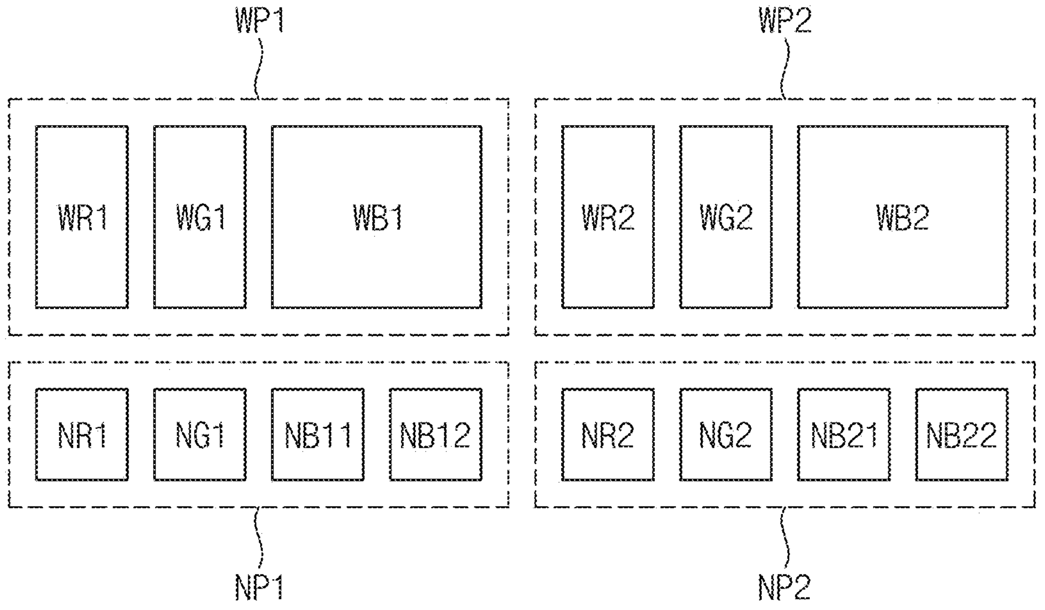
FIG. 17 is a diagram illustrating a pixel of a display panel of a display apparatus according to an embodiment of the present inventive concept in a public mode.
Figure 18:
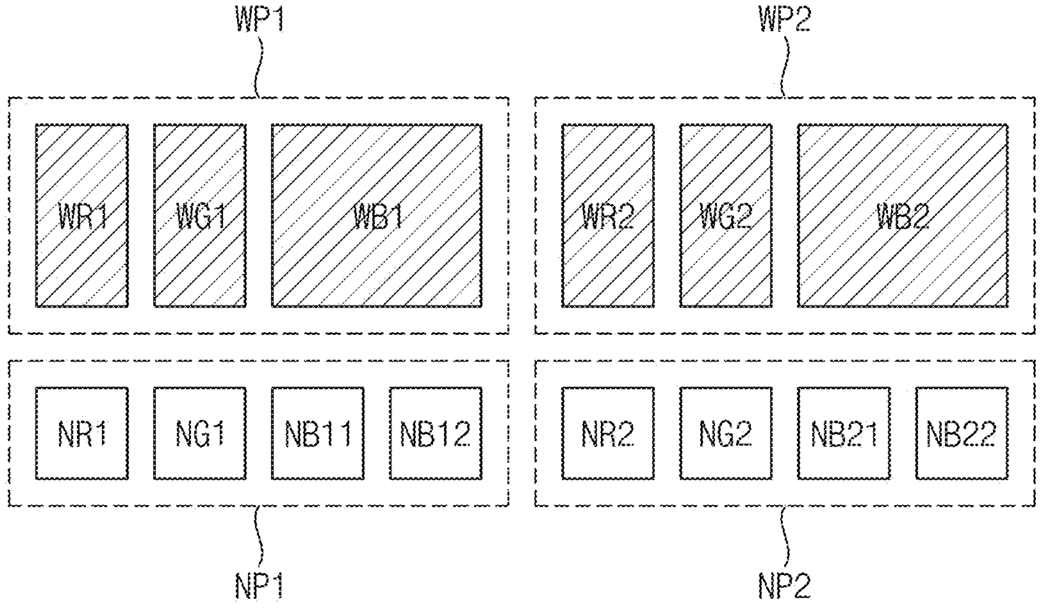
FIG. 18 is a diagram illustrating the pixel of the display panel of FIG. 17 in a private mode.

FIG. 17 is a diagram illustrating a pixel of a display panel of a display apparatus according to an embodiment of the present inventive concept in a public mode. FIG. 18 is a diagram illustrating the pixel of the display panel of FIG. 17 in a private mode.

The display apparatus and the method of driving the display apparatus according to an embodiment described with reference to FIGS. 17 and 18 are substantially the same as the display apparatus and the method of driving the display apparatus of an embodiment described with reference to FIGS. 1 to 11, except that both the normal pixel and the viewing angle control pixel are turned on in the public mode. Thus, the same reference numerals will be used to refer to the same or like parts as those described with reference to FIGS. 1 to 11 and any repetitive explanation concerning the above elements will be omitted.

Referring to FIGS. 17 and 18, the display panel may include normal pixels WP1 and WP2 and viewing angle control pixels NP1 and NP2. A viewing angle of each of the viewing angle control pixels NP1 and NP2 may be narrower than a viewing angle of each of the normal pixels WP1 and WP2.

In an embodiment, the normal pixels WP1 and WP2 may be turned on and the viewing angle control pixels NP1 and NP2 may be turned on in the public mode as shown in FIG. 17. The normal pixels WP1 and WP2 may be turned off and the viewing angle control pixels NP1 and NP2 may be turned on in the private mode as shown in FIG. 18.

In an embodiment, both the normal pixels WP1 and WP2 and the viewing angle control pixels NP1 and NP2 may be turned on in the public mode and only the viewing angle control pixels NP1 and NP2 may be turned on in the private mode. Accordingly, when the first display area (e.g., the driver display area) operates in the public mode and the second display area (e.g., the passenger display area) operates in the private mode, a boundary between the driver display area and the passenger display area may be shown.

According to an embodiment, different data voltages for the first display area and the second display area may be outputted for a same grayscale value. As a result, a boundary between the first display area and the second display area may be prevented from being visible when the first display area of the display panel 100 operates in the public mode and the second display area of the display panel 100 operates in the private mode.

Thus, according to embodiments, the boundary between the first display area and the second display area is not visible when the first display area operates in the public mode and the second display area operates in the private mode. Therefore, the display quality of the display panel 100 may be enhanced.

Figure 19:
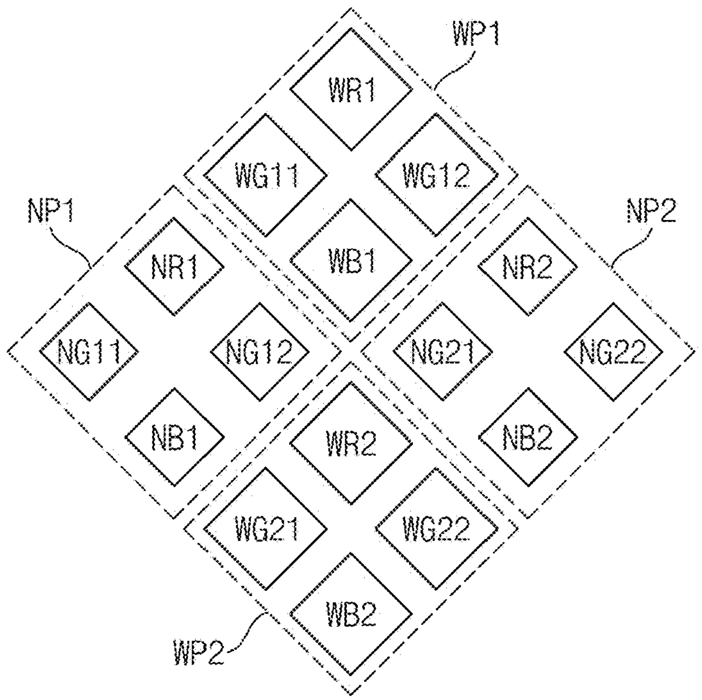
FIG. 19 is a diagram illustrating a pixel of a display panel of a display apparatus according to an embodiment of the present inventive concept.
Figure 20:
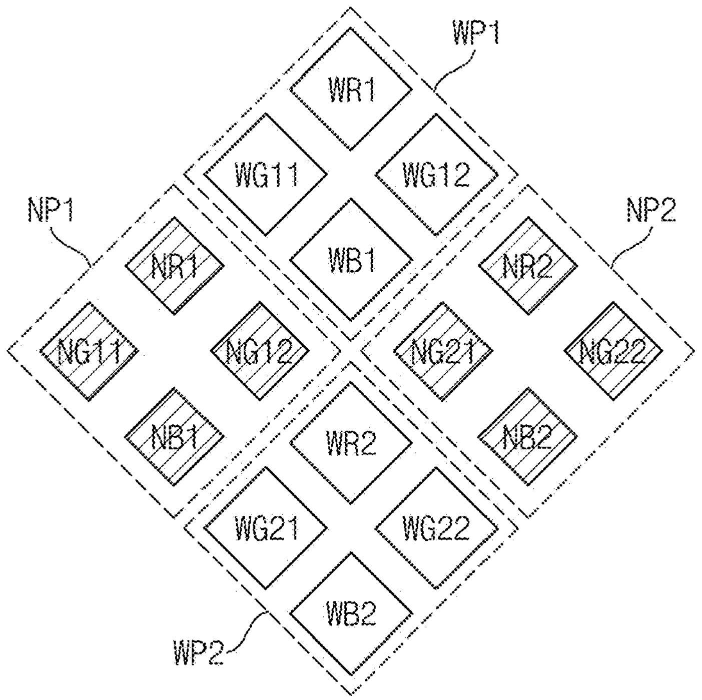
FIG. 20 is a diagram illustrating the pixel of the display panel of FIG. 19 in a public mode.
Figure 21:
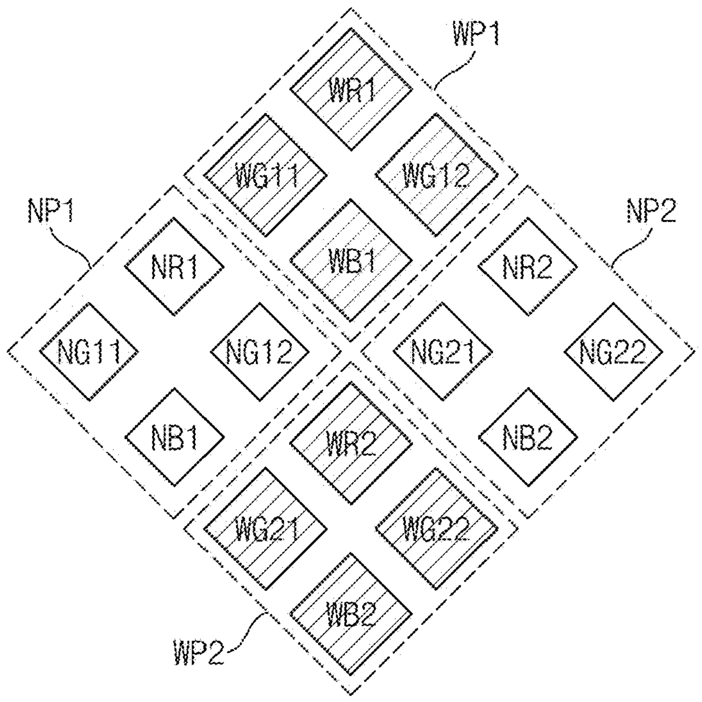
FIG. 21 is a diagram illustrating the pixel of the display panel of FIG. 19 in a private mode.

FIG. 19 is a diagram illustrating a pixel of a display panel 100 of a display apparatus according to an embodiment of the present inventive concept. FIG. 20 is a diagram illustrating the pixel of the display panel 100 of FIG. 19 in a public mode. FIG. 21 is a diagram illustrating the pixel of the display panel 100 of FIG. 19 in a private mode.

The display apparatus according to an embodiment described with reference to FIGS. 19 to 21 is substantially the same as the display apparatus described with reference to FIGS. 1 to 11, except for the shape of the pixel. Thus, the same reference numerals will be used to refer to the same or like parts as those described with reference to FIGS. 1 to 11 and any repetitive explanation concerning the above elements will be omitted.

Referring to FIGS. 19 to 21, the display panel may include normal pixels WP1 and WP2 and viewing angle control pixels NP1 and NP2. A viewing angle of each of the viewing angle control pixels NP1 and NP2 may be narrower than a viewing angle of each of the normal pixels WP1 and WP2.

In an embodiment, the normal pixels WP1 and WP2 may be turned on and the viewing angle control pixels NP1 and NP2 may be turned off in the public mode as shown in FIG. 20. The normal pixels WP1 and WP2 may be turned off and the viewing angle control pixels NP1 and NP2 may be turned on in the private mode as shown in FIG. 21.

A size of a light-emitting area of a subpixel of the viewing angle control pixels NP1 and NP2 may be smaller than a size of a light-emitting area of a subpixel of the normal pixels WP1 and WP2.

For example, the display panel 100 may include a first color first normal subpixel WR1, a second color 1-1 normal subpixel WG11, a second color 1-2 normal subpixel WG12 and a third color first normal subpixel WB1 disposed in a rhombic shape and may include a first color first viewing angle control subpixel NR1, a second color 1-1 viewing angle control subpixel NG11, a second color 1-2 viewing angle control subpixel NG12 and a third color first viewing angle control subpixel NB1 disposed in a rhombic shape.

For example, a size of a light-emitting area of the first color first normal subpixel WR1 may be larger than a size of a light-emitting area of the first color first viewing angle control subpixel NR1. A size of a light-emitting area of the second color 1-1 normal subpixel WG11 may be larger than a size of a light-emitting area of the second color 1-1 viewing angle control subpixel NG11. A size of a light-emitting area of the second color 1-2 normal subpixel WG12 may be larger than a size of a light-emitting area of the second color 1-2 viewing angle control subpixel NG12. A size of a light-emitting area of the third color first normal subpixel WB1 may be larger than a size of a light-emitting area of the third color first viewing angle control subpixel NB1.

Similarly, the display panel 100 may further include a first color second normal subpixel WR2, a second color 2-1 normal subpixel WG21, a second color 2-2 normal subpixel WG22 and a third color second normal subpixel WB2 disposed in a rhombic shape and may further include a first color second viewing angle control subpixel NR2, a second color 2-1 viewing angle control subpixel NG21, a second color 2-2 viewing angle control subpixel NG22 and a third color second viewing angle control subpixel NB2 disposed in a rhombic shape.

According to an embodiment, the data voltage of the first display area and the data voltage of the second display area, which are different from each other, may be outputted for a same grayscale value. As a result, a boundary between the first display area and the second display area may be prevented from being visible when the first display area of the display panel 100 operates in the public mode and the second display area of the display panel 100 operates in the private mode.

Thus, according to embodiments, the boundary between the first display area and the second display area is not visible when the first display area operates in the public mode and the second display area operates in the private mode. Therefore, the display quality of the display panel 100 may be enhanced.

Figure 22:
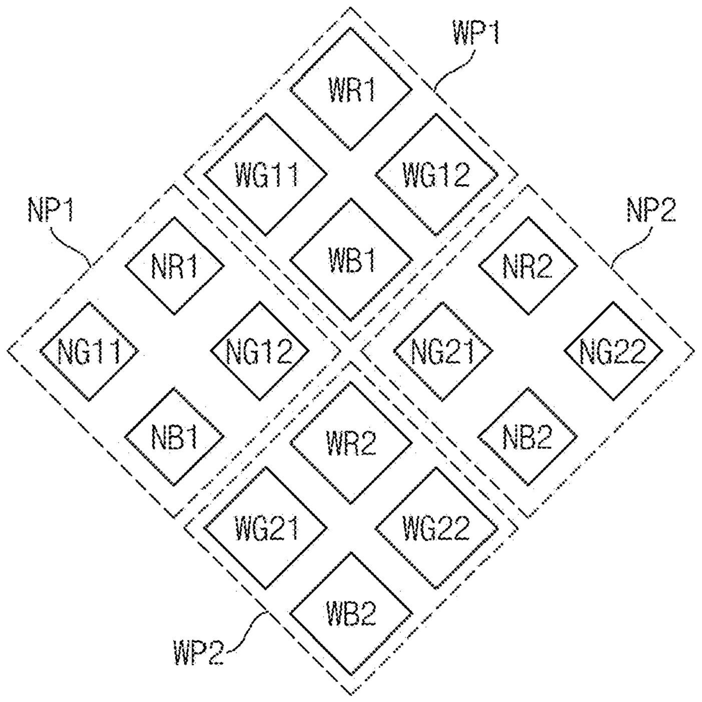
FIG. 22 is a diagram illustrating a pixel of a display panel of a display apparatus according to an embodiment of the present inventive concept in a public mode.
Figure 23:
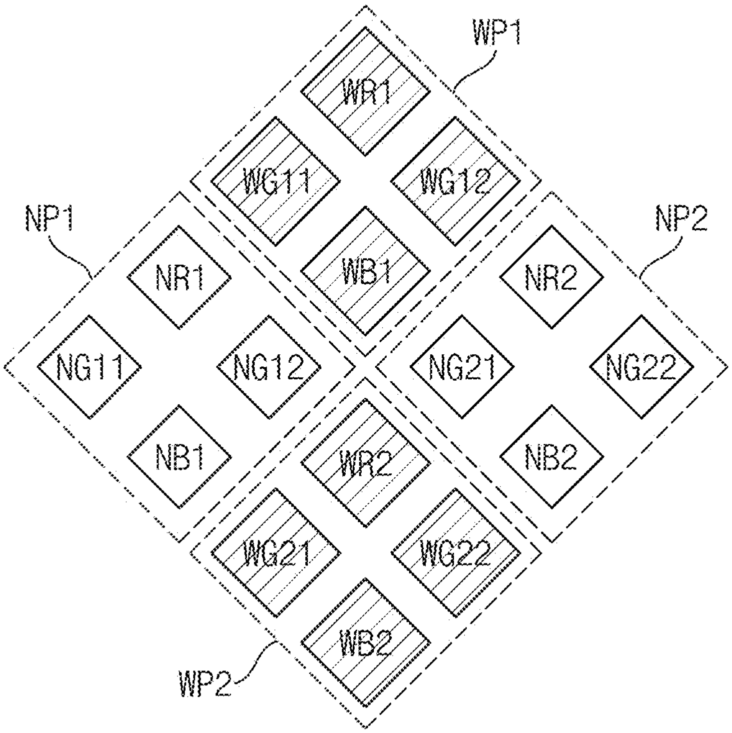
FIG. 23 is a diagram illustrating the pixel of the display panel of FIG. 22 in a private mode.

FIG. 22 is a diagram illustrating a pixel of a display panel of a display apparatus according to an embodiment of the present inventive concept in a public mode. FIG. 23 is a diagram illustrating the pixel of the display panel of FIG. 22 in a private mode.

The display apparatus and the method of driving the display apparatus according to an embodiment with reference to FIGS. 22 and 23 are substantially the same as the display apparatus and the method of driving the display apparatus according to an embodiment with reference to FIGS. 19 to 21, except that both the normal pixel and the viewing angle control pixel are turned on in the public mode. Thus, the same reference numerals will be used to refer to the same or like parts as those described with reference to FIGS. 19 to 21 and any repetitive explanation concerning the above elements will be omitted.

Referring to FIGS. 22 and 23, the display panel may include normal pixels WP1 and WP2 and viewing angle control pixels NP1 and NP2. A viewing angle of each of the viewing angle control pixels NP1 and NP2 may be narrower than a viewing angle of each of the normal pixels WP1 and WP2.

In an embodiment, the normal pixels WP1 and WP2 may be turned on and the viewing angle control pixels NP1 and NP2 may be turned on in the public mode as shown in FIG. 22. The normal pixels WP1 and WP2 may be turned off and the viewing angle control pixels NP1 and NP2 may be turned on in the private mode as shown in FIG. 23.

In an embodiment, both the normal pixels WP1 and WP2 and the viewing angle control pixels NP1 and NP2 may be turned on in the public mode and only the viewing angle control pixels NP1 and NP2 may be turned on in the private mode. Accordingly, when the driver display area operates in the public mode and the passenger display area operates in the private mode, a boundary between the driver display area and the passenger display area may be shown.

According to an embodiment, the data voltage of the first display area and the data voltage of the second display area, which are different from each other, may be outputted for a same grayscale value. As a result, a boundary between the first display area and the second display area may be prevented from being visible when the first display area of the display panel 100 operates in the public mode and the second display area of the display panel 100 operates in the private mode.

Thus, according to embodiments, the boundary between the first display area and the second display area is not visible when the first display area operates in the public mode and the second display area operates in the private mode. Therefore, the display quality of the display panel 100 may be enhanced.

Figure 24:
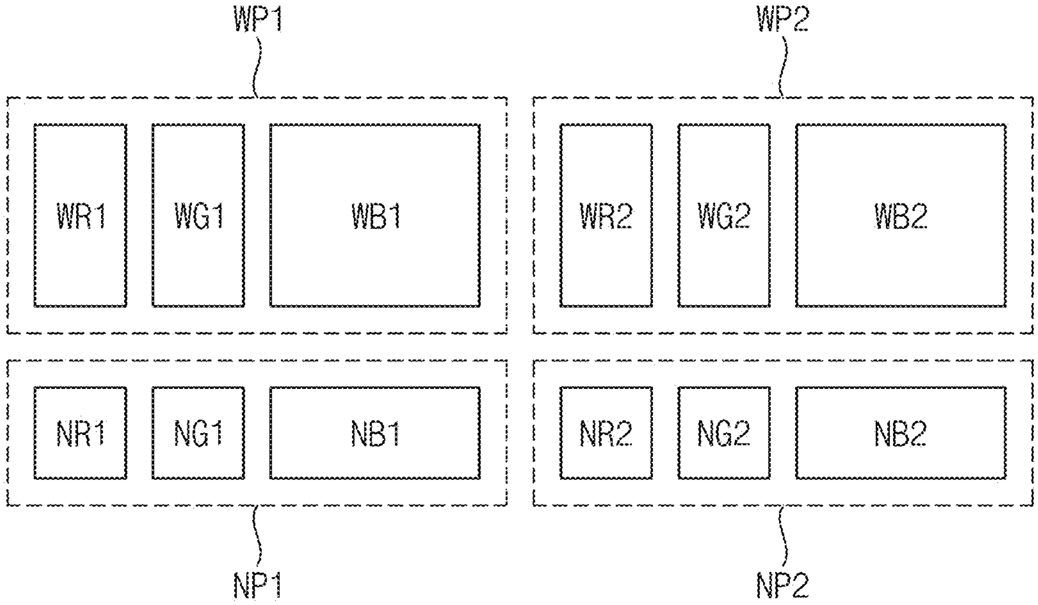
FIG. 24 is a diagram illustrating a pixel of a display panel of a display apparatus according to an embodiment of the present inventive concept.
Figure 25:
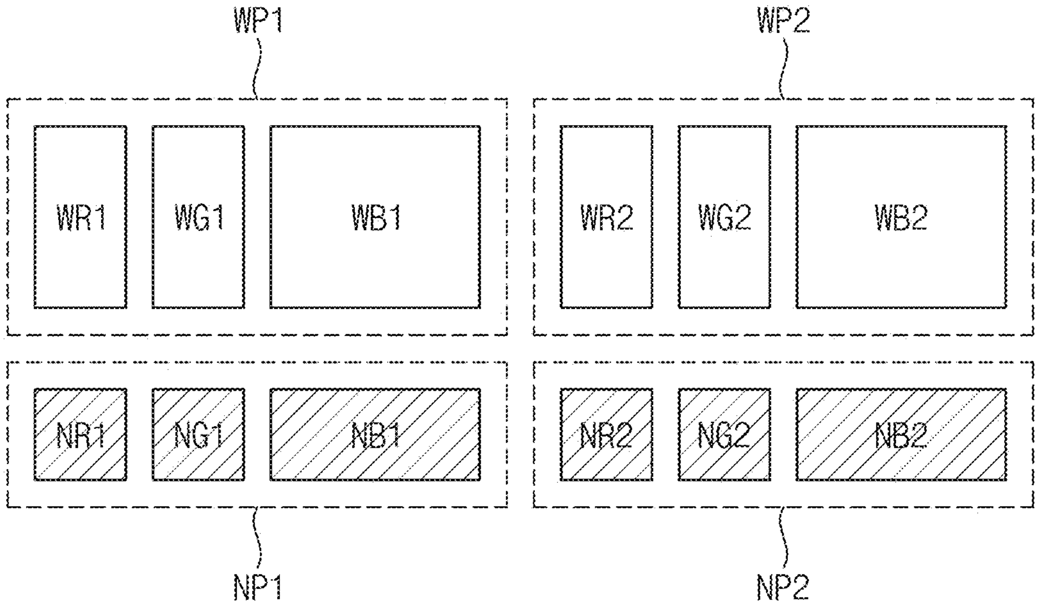
FIG. 25 is a diagram illustrating the pixel of the display panel of FIG. 24 in a public mode.
Figure 26:
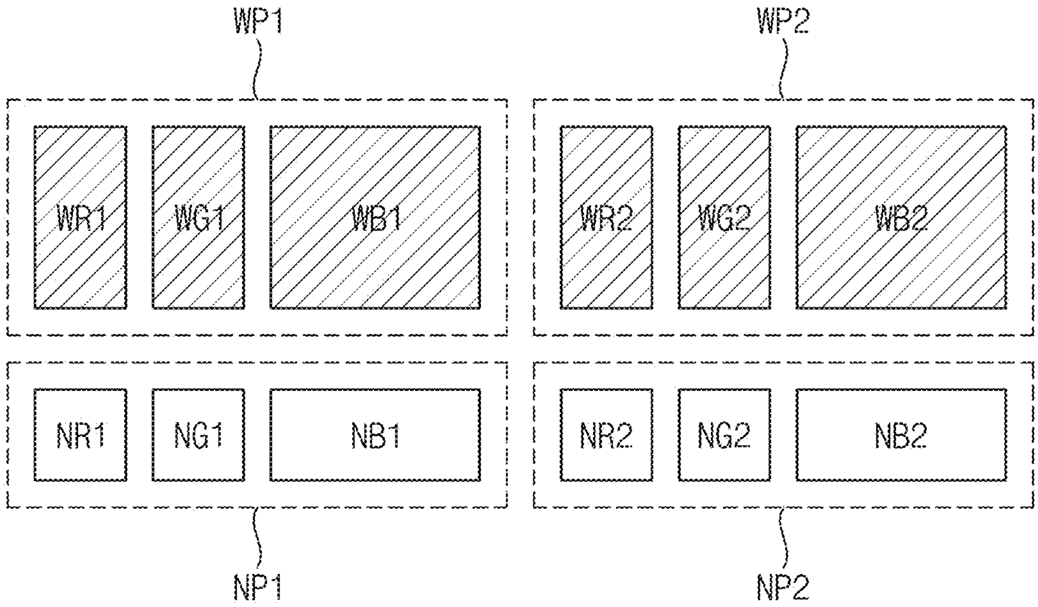
FIG. 26 is a diagram illustrating the pixel of the display panel of FIG. 24 in a private mode.

FIG. 24 is a diagram illustrating a pixel of a display panel 100 of a display apparatus according to an embodiment of the present inventive concept. FIG. 25 is a diagram illustrating the pixel of the display panel 100 of FIG. 24 in a public mode. FIG. 26 is a diagram illustrating the pixel of the display panel 100 of FIG. 24 in a private mode.

The display apparatus according to an embodiment described with reference to FIGS. 24 to 26 is substantially the same as the display apparatus according to an embodiment described with reference to FIGS. 1 to 11 except for the shape of the pixel. Thus, the same reference numerals will be used to refer to the same or like parts as those described with reference to FIGS. 1 to 11 and any repetitive explanation concerning the above elements will be omitted.

Referring to FIGS. 24 to 26, the display panel may include normal pixels WP1 and WP2 and viewing angle control pixels NP1 and NP2. A viewing angle of each of the viewing angle control pixels NP1 and NP2 may be narrower than a viewing angle of each of the normal pixels WP1 and WP2.

In an embodiment, the normal pixels WP1 and WP2 may be turned on and the viewing angle control pixels NP1 and NP2 may be turned off in the public mode as shown in FIG. 25. The normal pixels WP1 and WP2 may be turned off and the viewing angle control pixels NP1 and NP2 may be turned on in the private mode as shown in FIG. 26.

A size of a light-emitting area of a subpixel of the viewing angle control pixels NP1 and NP2 may be smaller than a size of a light-emitting area of a subpixel of the normal pixels WP1 and WP2.

For example, the display panel 100 may include a first color first normal subpixel WR1, a second color first normal subpixel WG1 and a third color first normal subpixel WB1 which are sequentially disposed in a first pixel row, and a first color first viewing angle control subpixel NR1, a second color first viewing angle control subpixel NG1 and a third color first viewing angle control subpixel NB1 which are sequentially disposed in a second pixel row.

For example, a size of a light-emitting area of the first color first normal subpixel WR1 may be larger than a size of a light-emitting area of the first color first viewing angle control subpixel NR1. A size of a light-emitting area of the second color first normal subpixel WG1 may be larger than a size of a light-emitting area of the second color first viewing angle control subpixel NG1. A size of a light-emitting area of the third color first normal subpixel WB1 may be larger than a size of a light-emitting area of the third color first viewing angle control subpixel NB1.

Similarly, the display panel 100 may further include a first color second normal subpixel WR2, a second color second normal subpixel WG2 and a third color second normal subpixel WB2 which are sequentially disposed in the first pixel row, and a first color second viewing angle control subpixel NR2, a second color second viewing angle control subpixel NG2, a third color second viewing angle control subpixel NB2 which are sequentially disposed in the second pixel row.

For example, a size of a light-emitting area of the first color second normal subpixel WR2 may be larger than a size of a light-emitting area of the first color second viewing angle control subpixel NR2. A size of a light-emitting area of the second color second normal subpixel WG2 may be larger than a size of a light-emitting area of the second color second viewing angle control subpixel NG2. A size of a light-emitting area of the third color second normal subpixel WB2 may be larger than a size of a light-emitting area of the third color second viewing angle control subpixel NB2.

According to an embodiment, the data voltage of the first display area and the data voltage of the second display area, which are different from each other, may be outputted for a same grayscale value. As a result, a boundary between the first display area and the second display area may be prevented from being visible when the first display area of the display panel 100 operates in the public mode and the second display area of the display panel 100 operates in the private mode.

Thus, according to embodiments, the boundary between the first display area and the second display area is not visible when the first display area operates in the public mode and the second display area operates in the private mode. Therefore, the display quality of the display panel 100 may be enhanced.

Figure 27:
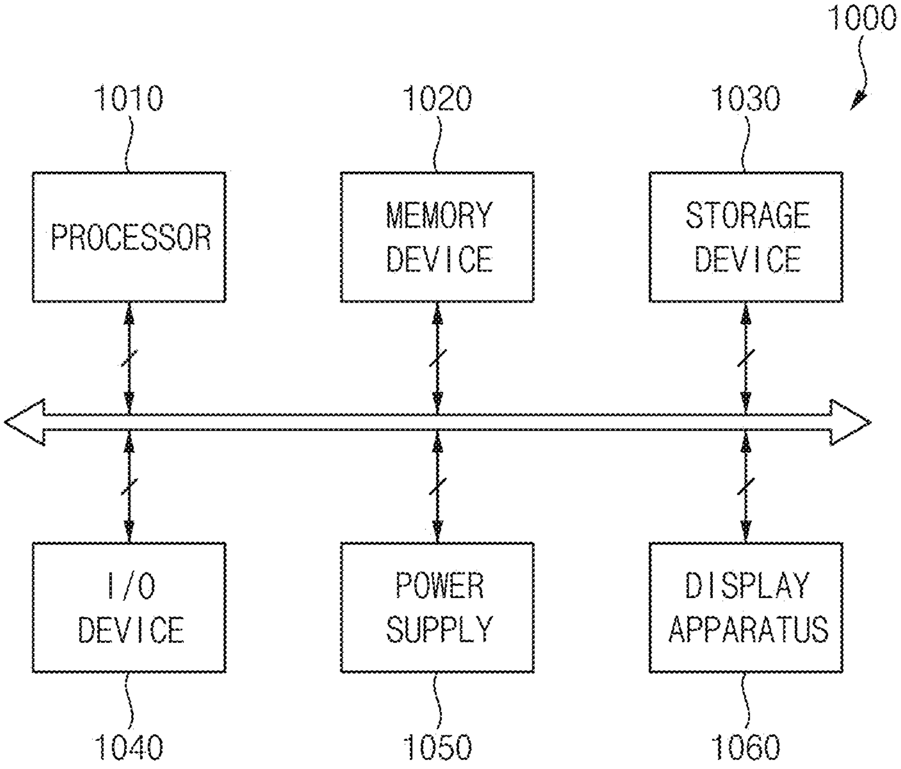
FIG. 27 is a block diagram illustrating an electronic apparatus according to an embodiment of the present inventive concept.

FIG. 27 is a block diagram illustrating an electronic apparatus 1000 according to an embodiment of the present inventive concept.

Referring to FIG. 27, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, the electronic apparatus 1000 may be implemented as a display system for an automotive vehicle. However, the electronic apparatus 1000 is not limited thereto. For example, the electronic apparatus 1000 may be implemented as a smartphone, a cellular phone, a video phone, a smart pad, a smart watch, a tablet PC, a car navigation system, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 28:
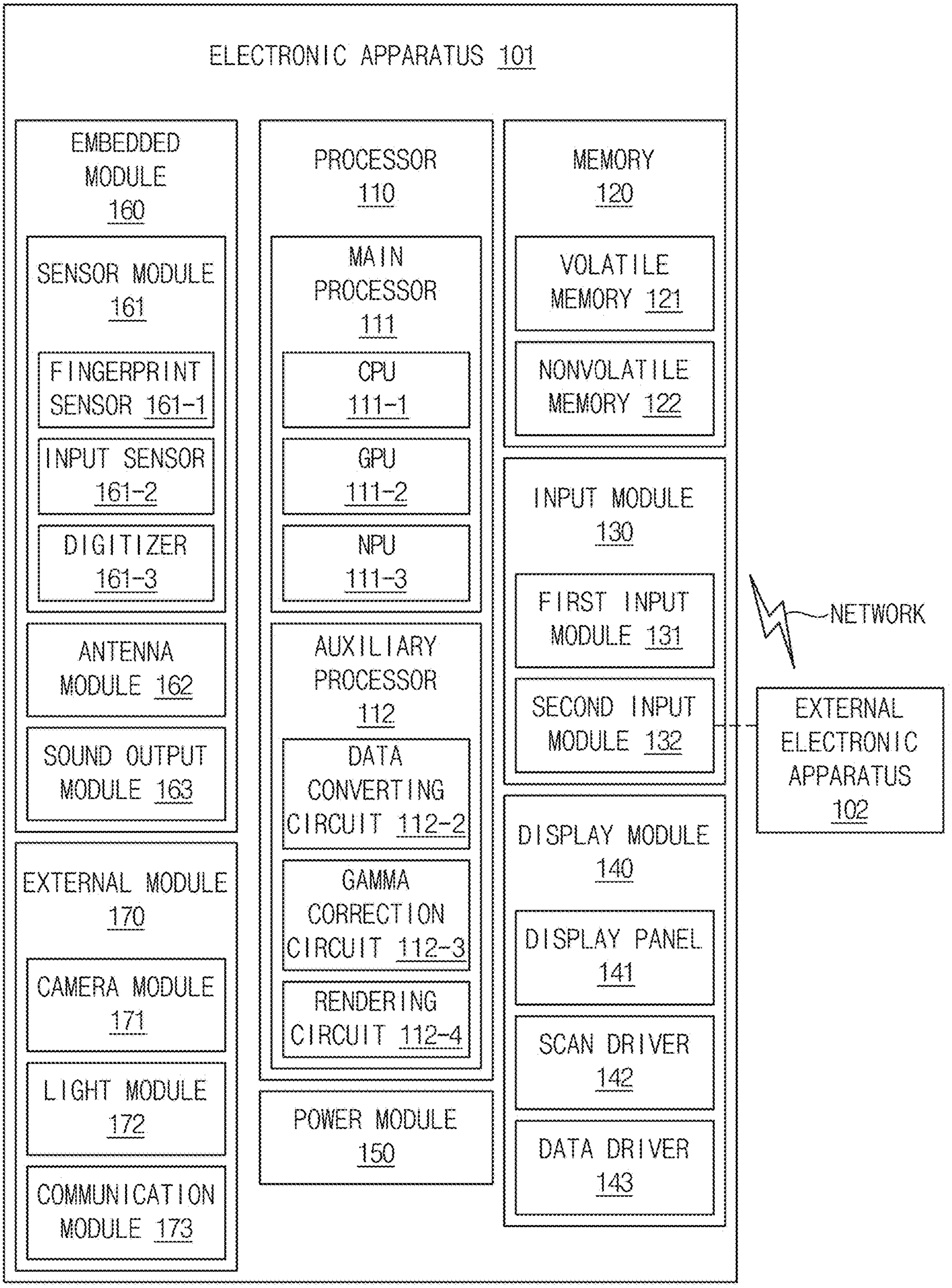
FIG. 28 is a block diagram illustrating an electronic apparatus according to an embodiment of the present inventive concept.

FIG. 28 is a block diagram illustrating an electronic apparatus 101 according to an embodiment of the present inventive concept.

Referring to FIGS. 1 to 28, an electronic apparatus 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. For example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains input fingerprint information as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input in the music streaming application, the processor 110 activates a sound output module 163 to provide sound information corresponding to the music execution command to the user.

In the above, the operation of the electronic apparatus 101 is briefly described. Hereinafter, a configuration of the electronic apparatus 101 is described in detail. Some of elements of the electronic apparatus 101 described later may be integrated and provided as one element, or one element may be separated as two or more elements.

The electronic apparatus 101 may communicate with an external electronic apparatus 102 through a network (e.g., a short-range wireless communication network or a long-range wireless communication network). According to an embodiment, the electronic apparatus 101 may include the processor 110, the memory 120, the input module 130, the display module 140, a power module 150, an embedded module 160, and an external module 170. According to an embodiment, in the electronic apparatus 101, at least one of the above-described elements may be omitted or one or more other apparatus may be added. According to an embodiment, some of the above-described elements (e.g., the sensor module 161, an antenna module 162 or the sound output module 163) may be integrated into another element (e.g., the display module 140).

The processor 110 may execute software to control at least one other element (e.g., hardware or software element) of the electronic apparatus 101 connected to the processor 110 and to perform various data processing or operations. According to an embodiment, as at least part of the data processing or the operations, the processor 110 may store receive instructions or data from other elements (e.g. the input module 130, the sensor module 161 or a communication module 173) in a volatile memory 121, may process the instructions or data stored in the volatile memory 121 and may store result data of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include any one or more of a graphic processing unit (GPU) 111-2, a communication processor (CP) and an image signal processor (ISP). The main processor 111 may further include a neural processing unit (NPU) 111-3. The neural network processing unit 111-3 is a processor specialized in processing an artificial intelligence model. The artificial intelligence model may be generated through a machine learning. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN) and a deep Q-networks or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g., a single chip) or each may be implemented as independent elements (e.g., in a plurality of chips).

The auxiliary processor 112 may include a controller. The controller may include an interface conversion circuit and a timing control circuit. The controller receives an image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance according to characteristics of the electronic apparatus 101 or a user setting or may convert the image data to reduce a power consumption or compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one of the data converting circuit 112-2, the gamma correction circuit 112-3 and the rendering circuit 112-4 may be integrated into another element (e.g., the main processor 111 or the controller). At least one of the data converting circuit 112-2, the gamma correction circuit 112-3 and the rendering circuit 112-4 may be integrated into a data driver 143 to be described later.

The memory 120 may store various data used by at least one element (e.g., the processor 110 or the sensor module 161) of the electronic apparatus 101 and input data or output data for commands related thereto. The memory 120 may include at least one of the volatile memory 121 and the nonvolatile memory 122.

The input module 130 may receive commands or data used to the elements (e.g., the processor 110, the sensor module 161 or the sound output module 163) of the electronic apparatus 101 from the outside of the electronic apparatus 101 (e.g., the user or the external electronic apparatus 102).

The input module 130 may include a first input module 131 for receiving commands or data from the user and a second input module 132 for receiving commands or data from the external electronic apparatus 102. The first input module 131 may include a microphone, a mouse, a keyboard, a key (e.g., a button) or a pen (e.g., a passive pen or an active pen). The second input module 132 may support a designated protocol capable of connecting to the external electronic apparatus 102 by wire or wirelessly. According to an embodiment, the second input module 132 may include a high definition multimedia interface (HDMI), a universal serial bus (USB) interface, an SD card interface or an audio interface. The second input module 132 may include a connector physically connected to the external electronic apparatus 102, for example, an HDMI connector, a USB connector, an SD card connector, or an audio connector (e.g., a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. A type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. Alternatively, the scan driver 142 may be integrated on the display panel 141. For example, the scan driver 142 may include an amorphous silicon TFT gate driver circuit (ASG) integrated on the display panel 141, a low temperature polycrystalline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. The light emission driver may be formed independently from the scan driver 142. Alternatively, the light emission driver and the scan driver 142 may be integrally formed.

The data driver 143 receives a control signal from the controller and converts the image data into an analog voltage (e.g., the data voltage) and output the data voltages to the display panel 141 in response to the control signal.

The data driver 143 may be integrated into another element (e.g., the controller). The functions of the interface conversion circuit and the timing control circuit of the controller described above may be integrated into the data driver 143.

The display module 140 may further include a voltage generating circuit. The voltage generating circuit may output various voltages for driving the display panel 141. The power module 150 supplies power to elements of the electronic apparatus 101.

The power module 150 may include a battery which supplies a power voltage. The battery may include a non-rechargeable primary cell, a rechargeable secondary cell or a fuel cell. The power module 150 may include a power management integrated circuit (PMIC). The PMIC supplies optimized power to each of the above-described modules and modules described later. The power module 150 may include a wireless power transmission/reception member electrically connected to the battery. The wireless power transmission/reception member may include a plurality of antenna radiators in a form of coils.

The electronic apparatus 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corresponding to the input. The sensor module 161 may include at least one of the fingerprint sensor 161-1, the input sensor 161-2 and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure biosignals such as a blood pressure, a moisture, or a body fat. For example, when a user touches a part of his body to a sensor layer or a sensing panel and does not move for a certain period of time, the input sensor 161-2 may detect the biosignal based on a change in an electric field caused by the part of the body so that the display module 140 may output user's desired information.

The digitizer 161-3 may generate a data value corresponding to the coordinate information input by the pen. The digitizer 161-3 generates an amount of electromagnetic change by the input as a data value. The digitizer 161-3 may detect an input by the passive pen or transmit/receive data to/from the active pen.

At least one of the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one of the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The present inventive concept may not be limited to a position of the sensing panel.

At least one of the fingerprint sensor 161-1, the input sensor 161-2 and the digitizer 161-3 may be embedded in the display panel 141. For example, at least one of the fingerprint sensor 161-1, the input sensor 161-2 and the digitizer 161-3 is formed simultaneously with the display panel 141 through a process of forming elements included in the display panel 141 (e.g., light emitting elements, transistors, etc.).

In addition, the sensor module 161 may generate an electrical signal or a data value corresponding to an internal state or an external state of the electronic apparatus 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor or an illuminance sensor.

The antenna module 162 may include one or more antennas for transmitting a signal or power to outside or receiving a signal or power from outside. According to an embodiment, the communication module 173 may transmit a signal to an external electronic apparatus or receive a signal from an external electronic apparatus through an antenna suitable for a communication method. An antenna pattern of the antenna module 162 may be integrated with an element of the display module 140 (e.g., the display panel 141) or the input sensor 161-2.

The sound output module 163 is a device for outputting sound signals to the outside of the electronic apparatus 101. For example, the sound output module 163 may include a speaker used for general purposes such as playing multimedia or recording and a receiver used exclusively for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze.

The light module 172 may provide a light. The light module 172 may include a light emitting diode or a xenon lamp. The light module 172 may operate in conjunction with the camera module 171 or operate independently.

The communication module 173 may support establishment of a wired or wireless communication channel between the electronic apparatus 101 and the external electronic apparatus 102 and communication through the established communication channel. The communication module 173 may include one or both a wireless communication module such as a cellular communication module, a short-distance wireless communication module, or a global navigation satellite system (GNSS) communication module and a wired communication module such as a local area network (LAN) communication module, or a power line communication module. The communication module 173 may communicate with the external electronic apparatus 102 through a short-range communication network such as Bluetooth, WiFi direct or infrared data association (IrDA) or a long-distance communication network such as a cellular network, the Internet, or a computer network (e.g., LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. For example, the processor 110 may generate image data corresponding to input data applied through a mouse or an active pen, and output the generated image data to the display module 140 or the processor 110 may generate command data corresponding to the input data and output the generated command data to the camera module 171 or the light module 172. When input data is not received from the input module 130 for a certain period of time, the processor 110 converts an operation mode of the electronic apparatus 101 into a low power mode or a sleep mode so that a power consumption of the electronic apparatus 101 may be reduced.

The processor 110 outputs commands or data to the display module 140, the sound output module 163, the camera module 171 or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the sensed data sensed by the input sensor 161-2 or the digitizer 161-3. When the sensor module 161 includes a temperature sensor, the processor 110 may receive temperature data for the temperature measured from the sensor module 161 and may further perform luminance correction on the image data based on the temperature data.

The processor 110 may receive determined data about the presence or the absence of the user, the user's location and the user's gaze from the camera module 171. The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output (GPIO), a serial peripheral interface (SPI), a mobile industry processor interface (MIPI), or an ultra path interconnect (UPI) link to exchange signals (e.g., commands or data) with each other. The processor 110 may communicate with the display module 140 through an agreed interface. For example, the processor 110 may communicate with the display module 140 through any one of the above communication methods. The present inventive concept may not be limited to the above communication methods.

The electronic apparatus 101 according to various embodiments disclosed in the disclosure may be various types of apparatuses. For example, the electronic apparatus 101 may include at least one of a monitor, a portable communication apparatus (e.g., a smart phone), a computer apparatus, a portable multimedia apparatus, a portable medical apparatus, a camera, a wearable device and a home appliance. The electronic apparatus 101 according to the embodiment of the disclosure may not be limited to the aforementioned apparatuses.

For example, the display panel 100 of FIG. 1 may correspond to the display panel 141 of FIG. 28. For example, the driving controller 200 of FIG. 1 may correspond to the controller of the auxiliary processor 112 of FIG. 28. For example, the gate driver 300 of FIG. 1 may correspond to the scan driver 142 of FIG. 28. For example, the data driver 500 of FIG. 1 may correspond to the data driver 143 of FIG. 28.

Figure 29:
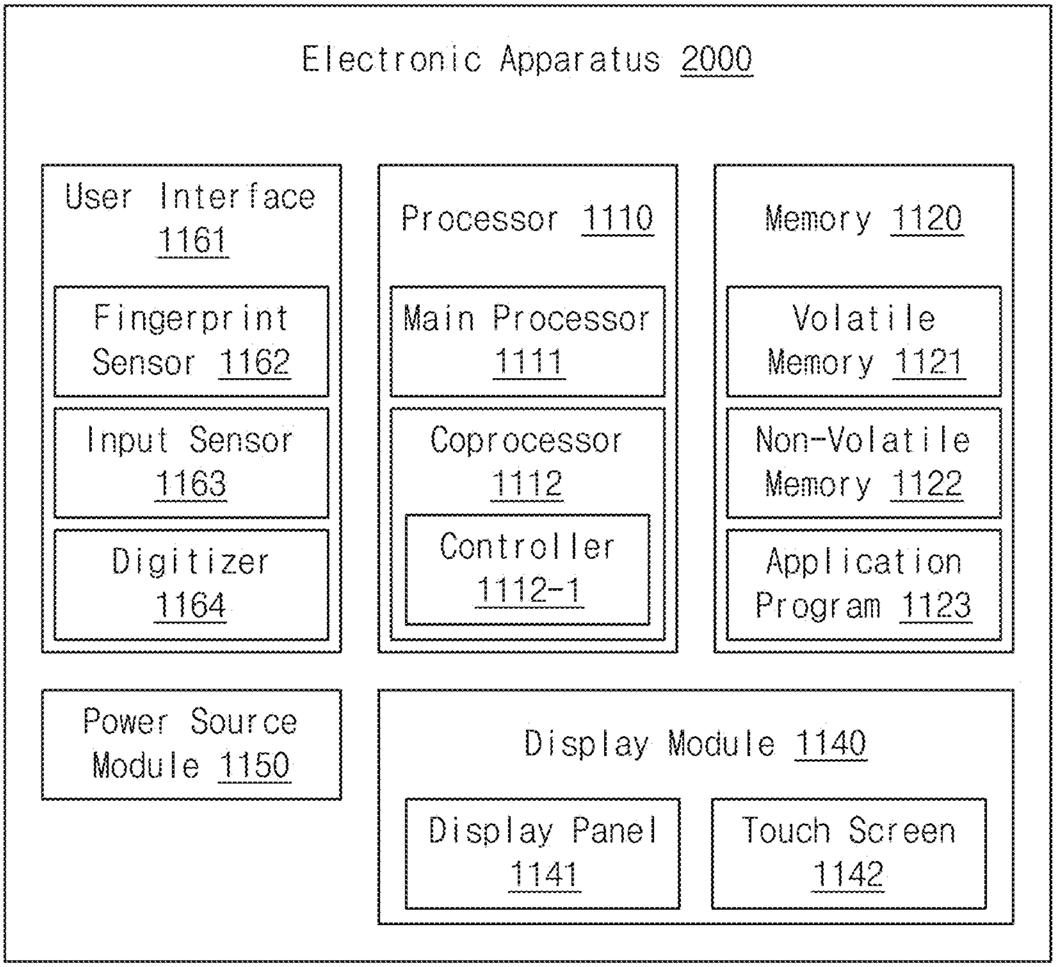
FIG. 29 is a diagram illustrating an electronic apparatus according to an embodiment of the present inventive concept.

FIG. 29 is a diagram illustrating an electronic apparatus according to an embodiment of the present inventive concept.

Referring to FIG. 29, the electronic apparatus 2000 according to an embodiment of the present inventive concept may output various information (e.g., images, text, music, etc.) through a display module 1140, which, for example, may correspond to the display apparatus described above. When a processor 1110 executes an application stored in a memory 1120, the display module 1140 may provide application information to a user through a display panel 1141.

In some embodiments, the electronic apparatus 2000 may be configured as, for example, a smartphone, camera, smart TV, monitor, smartwatch, tablet, automotive display, or AR/VR headset. For example, the electronic apparatus 2000 may be a smartphone including a touch-sensitive display area DA for interaction and a non-display area NDA including sensors and circuits for enhanced functionality. For example, the electronic apparatus 2000 may be a television or monitor including a large display area DA for high-resolution video playback and a non-display area NDA incorporating driving circuits or connectivity modules for external inputs. For example, the electronic apparatus 2000 may be a smartwatch including a display area DA optimized for compact and high-clarity visuals and a non-display area NDA integrating biometric sensors for health monitoring. In some cases, the electronic apparatus 2000 be an AR/VR headset.

In some embodiments, memory 1120 may store information such as software codes for operating an application program 1123. The application program 1123 may include software designed to execute specific tasks or provide functionality to a user. The application program 1123 may operate under the control of the processor 1110 and utilizes data stored in the memory 1120 to deliver a wide range of features, such as, for example, productivity tools, multimedia streaming and playback, file or mail deliveries or communication services. The application program 1123 interacts seamlessly with the user interface 1161 or touch screen 1142, allowing a user to launch, navigate, and utilize the program through user inputs such as, for example, touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

In an embodiment, when a user wishes to make a phone call, the user taps the telephone icon displayed on the display module 1140, and the processor 1110 may execute a phone application program stored in the memory 1120. A telephone keypad may be presented on the display panel 1141 for the user to enter a phone number to call.

In an embodiment, the display module 1140 may be integrated into an electronic apparatus 2000, such as, for example, a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic apparatus 2000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display apparatus described above.

The user interface 1161 serves as the interaction medium between a user and the electronic apparatus 2000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as, for example, blood pressure, moisture, or body mass.

The input sensor 1163 may sense user interactions including, for example, touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic apparatus 2000. The display panel 1141 (or display) may include, for example, a liquid crystal display panel, an organic light emitting display panel, or an inorganic light emitting display panel. However, the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display panel 1141 may include the display apparatus described above.

The power source module 1150 may supply power to the components of the electronic apparatus 2000. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power to each of the components described above including the display module 1140.

As is traditional in the field of the present inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

According to the embodiments of the display apparatus, the method of driving the display apparatus and the electronic apparatus including the display apparatus, the display quality of the display panel may be enhanced.

While the present inventive concept has been particularly shown and described with reference to embodiments thereof, it will be understood by those of ordinary skill in the art that various changes in form and detail may be made therein without departing from the spirit and scope of the present inventive concept as defined by the following claims.

What is claimed is:

1. A display apparatus, comprising:

a display panel including a first display area and a second display area disposed adjacent to the first display area; and a display panel driver configured to determine an update boundary point indicating a boundary between the first display area and the second display area, determine whether the update boundary point differs from a previous boundary point, and in response to determining that the update boundary point differs from the previous boundary point, determines first pixels of the display panel that correspond to the first display area and second pixels of the display panel that correspond to the second display area based on the update boundary point, outputs a first data voltage to at least one of the first pixels for a grayscale value of a display image, and outputs a second data voltage different from the first data voltage to at least one of the second pixels for the same grayscale value when the first display area operates in a public mode and the second display area operates in a private mode, and wherein a viewing angle of the display image displayed in the private mode is narrower than a viewing angle of the display image displayed in the public mode.

2. The display apparatus of claim 1, wherein when the first display area operates in the public mode and the second display area operates in the private mode, the first data voltage is generated based on a first gamma lookup table and the second data voltage is generated based on a second gamma lookup table different from the first gamma lookup table.

3. The display apparatus of claim 2, wherein a unit area luminance represented by a gamma reference voltage of the second gamma lookup table is higher than a unit area luminance represented by a gamma reference voltage of the first gamma lookup table.

4. The display apparatus of claim 1, wherein when both the first display area and the second display area operate in the public mode or both the first display area and the second display area operate in the private mode, the first data voltage output by the display panel driver to the first display area and the second data voltage output by the display panel driver to the second display area are about equal to each other for the same grayscale value.

5. The display apparatus of claim 4, wherein when both the first display area and the second display area operate in the public mode, the first data voltage output by the display panel driver to the first display area and the second data voltage output by the display panel driver to the second display area are generated based on a first gamma lookup table, and wherein when both the first display area and the second display area operate in the private mode, the first data voltage output by the display panel driver to the first display area and the second data voltage output by the display panel driver to the second display area are generated based on a second gamma lookup table different from the first gamma lookup table.

6. The display apparatus of claim 5, wherein a unit area luminance represented by a gamma reference voltage of the second gamma lookup table is higher than a unit area luminance represented by a gamma reference voltage of the first gamma lookup table.

7. The display apparatus of claim 1, wherein when the first display area operates in the public mode and the second display area operates in the private mode, the display panel driver is configured to determine an update driving mode and the update boundary point.

8. The display apparatus of claim 7, wherein when a previous driving mode and the update driving mode are the same as each other and the previous boundary point and the update boundary point are the same as each other, the display panel driver is configured to maintain a previous gamma lookup table.

9. The display apparatus of claim 7, wherein when a previous driving mode and the update driving mode are different from each other or the previous boundary point and the update boundary point are different from each other and a scan direction of the display panel is perpendicular to a direction in which the first display area and the second display area are adjacent to each other, the display panel driver is configured to generate a data enable count signal by counting a data enable signal.

10. The display apparatus of claim 9, wherein when the previous driving mode and the update driving mode are different from each other or the previous boundary point and the update boundary point are different from each other, the scan direction of the display panel is perpendicular to the direction in which the first display area and the second display area are adjacent to each other, and the data enable count signal is less than the update boundary point, a data voltage of a present time point is generated using a first gamma lookup table, and wherein when the previous driving mode and the update driving mode are different from each other or the previous boundary point and the update boundary point are different from each other, the scan direction of the display panel is perpendicular to the direction in which the first display area and the second display area are adjacent to each other, and the data enable count signal is equal to or greater than the update boundary point, the data voltage of the present time point is generated using a second gamma lookup table different from the first gamma lookup table.

11. The display apparatus of claim 7, wherein when a previous driving mode and the update driving mode are different from each other or the previous boundary point and the update boundary point are different from each other and a scan direction of the display panel is parallel to a direction in which the first display area and the second display area are adjacent to each other, the display panel driver is configured to generate a gate line count signal.

12. The display apparatus of claim 11, wherein when the previous driving mode and the update driving mode are different from each other or the previous boundary point and the update boundary point are different from each other, the scan direction of the display panel is parallel to the direction in which the first display area and the second display area are adjacent to each other, and the gate line count signal is less than the update boundary point, a data voltage of a present time point is generated using a first gamma lookup table, and wherein when the previous driving mode and the update driving mode are different from each other or the previous boundary point and the update boundary point are different from each other, the scan direction of the display panel is parallel to the direction in which the first display area and the second display area are adjacent to each other, and the gate line count signal is equal to or greater than the update boundary point, the data voltage of the present time point is generated using a second gamma lookup table different from the first gamma lookup table.

13. The display apparatus of claim 1, wherein the display panel includes a normal pixel and a viewing angle control pixel, and wherein a viewing angle of the viewing angle control pixel is narrower than a viewing angle of the normal pixel.

14. The display apparatus of claim 13, wherein a size of a light-emitting area of a subpixel of the viewing angle control pixel is smaller than a size of a light-emitting area of a subpixel of the normal pixel.

15. The display apparatus of claim 13, wherein the normal pixel is turned on and the viewing angle control pixel is turned off in the public mode, and wherein the normal pixel is turned off and the viewing angle control pixel is turned on in the private mode.

16. The display apparatus of claim 13, wherein the normal pixel is turned on and the viewing angle control pixel is turned on in the public mode, and wherein the normal pixel is turned off and the viewing angle control pixel is turned on in the private mode.

17. The display apparatus of claim 13, wherein the display panel includes:

a first color first normal subpixel, a second color first normal subpixel and a third color first normal subpixel which are sequentially disposed in a first pixel row; and a first color first viewing angle control subpixel, a second color first viewing angle control subpixel, a third color 1-1 viewing angle control subpixel and a third color 1-2 viewing angle control subpixel which are sequentially disposed in a second pixel row.

18. The display apparatus of claim 17, wherein a size of a light-emitting area of the first color first normal subpixel is larger than a size of a light-emitting area of the first color first viewing angle control subpixel, wherein a size of a light-emitting area of the second color first normal subpixel is larger than a size of a light-emitting area of the second color first viewing angle control subpixel, and wherein a size of a light-emitting area of the third color first normal subpixel is larger than a sum of a size of a light-emitting area of the third color 1-1 viewing angle control subpixel and a size of a light-emitting area of the third color 1-2 viewing angle control subpixel.

19. The display apparatus of claim 13, wherein the display panel includes:

a first color first normal subpixel, a second color 1-1 normal subpixel, a second color 1-2 normal subpixel and a third color first normal subpixel disposed in a rhombic shape; and a first color first viewing angle control subpixel, a second color 1-1 viewing angle control subpixel, a second color 1-2 viewing angle control subpixel and a third color first viewing angle control subpixel disposed in a rhombic shape.

20. An electronic device, comprising:

a processor;

a memory having stored application programs for execution by the processor;

a display apparatus, comprising:

a display panel including a first display area and a second display area disposed adjacent to the first display area;

a display panel driver configured to determine an update boundary point indicating a boundary between the first display area and the second display area, determine whether the update boundary point differs from a previous boundary point, and in response to determining that the update boundary point differs from the previous boundary point, determines first pixels of the display panel that correspond to the first display area and second pixels of the display panel that correspond to the second display area based on the update boundary point, outputs a first data voltage to at least one of the first pixels for a grayscale value of a display image, and outputs a second data voltage different from the first data voltage to at least one of the second pixels for the same grayscale value when the first display area operates in a public mode and the second display area operates in a private mode, and wherein a viewing angle of the display image displayed in the private mode is narrower than a viewing angle of a display image displayed in the public mode; and a user interface configured to sense user input via touch or cursor select of an icon presented on the display panel, wherein the processor is caused to execute one or more of the stored application programs upon receipt of the user input.

* * * * *